United States Patent
Marchant

[19]

[11] Patent Number: 6,035,313
[45] Date of Patent: Mar. 7, 2000

[54] MEMORY ADDRESS GENERATOR FOR AN FFT

[75] Inventor: Jeffrey David Marchant, Port Jervis, N.Y.

[73] Assignee: Motorola, Inc., Schaumburg, Ill.

[21] Appl. No.: 08/823,384

[22] Filed: Mar. 24, 1997

[51] Int. Cl.[7] .................................................. G06F 15/00
[52] U.S. Cl. .......................................................... 708/404
[58] Field of Search ..................................... 708/403–409

[56] References Cited

U.S. PATENT DOCUMENTS

| | | | |
|---|---|---|---|
| 4,547,862 | 10/1985 | McIver et al. | 708/404 |
| 5,163,017 | 11/1992 | Wong et al. | 708/406 |
| 5,365,469 | 11/1994 | Mercy | 708/404 |

*Primary Examiner*—Chuong Dinh Ngo
*Attorney, Agent, or Firm*—Frederick M. Fliegel; John C. Scott; Frank J. Bogacz

[57] ABSTRACT

A fast Fourier transformer (160) includes an FFT engine (162) having a twiddle index input and a memory bus coupled to a data input (167), a memory (164) coupled to the memory bus, an address generator (163) coupled to the memory (164), a twiddle index generator (150) including an output coupled to the twiddle index input, a counter (161) having an output coupled to inputs of the twiddle index generator (150) and the address generator (163) and a data output (168) coupled to the FFT engine (162) and to the memory (164).

5 Claims, 12 Drawing Sheets

| COUNTER | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| $P_S$ | 0 | 8 | 4 | 12 | 2 | 10 | 6 | 14 | 1 | 9 | 5 | 13 | 3 | 11 | 7 | 15 |

STAGE 0

| $T(\ )$ | 0 | | | | 0 | | | | 0 | | | | 0 | | | |
|---|---|---|---|---|---|---|---|---|---|---|---|---|---|---|---|---|
| $k_2$ | 0 | 2 | 1 | 3 | 0 | 2 | 1 | 3 | 0 | 2 | 1 | 3 | 0 | 2 | 1 | 3 |
| $k_1$ | 0 | 0 | 0 | 0 | 1 | 1 | 1 | 1 | 0 | 0 | 0 | 0 | 1 | 1 | 1 | 1 |
| $k_0$ | 0 | 0 | 0 | 0 | 0 | 0 | 0 | 0 | 1 | 1 | 1 | 1 | 1 | 1 | 1 | 1 |
| $Y_0(\ )$ | 0 | 8 | 4 | 12 | 2 | 10 | 6 | 14 | 1 | 9 | 5 | 13 | 3 | 11 | 7 | 15 |
| A | 0 | 8 | 4 | 12 | 2 | 10 | 6 | 14 | 1 | 9 | 5 | 13 | 3 | 11 | 7 | 15 |

$\beta_0$

| $n_0$ | 0 | 2 | 1 | 3 | 0 | 2 | 1 | 3 | 0 | 2 | 1 | 3 | 0 | 2 | 1 | 3 |
|---|---|---|---|---|---|---|---|---|---|---|---|---|---|---|---|---|
| $k_1$ | 0 | 0 | 0 | 0 | 1 | 1 | 1 | 1 | 0 | 0 | 0 | 0 | 1 | 1 | 1 | 1 |
| $k_0$ | 0 | 0 | 0 | 0 | 0 | 0 | 0 | 0 | 1 | 1 | 1 | 1 | 1 | 1 | 1 | 1 |
| $Y_1(\ )$ | 0 | 8 | 4 | 12 | 2 | 10 | 6 | 14 | 1 | 9 | 5 | 13 | 3 | 11 | 7 | 15 |

$\omega_0$

STAGE 1

| $T(\ )$ | 0 | | 4 | | 2 | | 6 | | 0 | | 4 | | 2 | | 6 | |
|---|---|---|---|---|---|---|---|---|---|---|---|---|---|---|---|---|
| $n_0$ | 0 | 0 | 2 | 2 | 1 | 1 | 3 | 3 | 0 | 0 | 2 | 2 | 1 | 1 | 3 | 3 |
| $k_1$ | 0 | 1 | 0 | 1 | 0 | 1 | 0 | 1 | 0 | 1 | 0 | 1 | 0 | 1 | 0 | 1 |
| $k_0$ | 0 | 0 | 0 | 0 | 0 | 0 | 0 | 0 | 1 | 1 | 1 | 1 | 1 | 1 | 1 | 1 |
| $Y_1(\ )$ | 0 | 2 | 8 | 10 | 4 | 6 | 12 | 14 | 1 | 3 | 9 | 11 | 5 | 7 | 13 | 15 |
| A | 0 | 2 | 8 | 10 | 4 | 6 | 12 | 14 | 1 | 3 | 9 | 11 | 5 | 7 | 13 | 15 |

$\beta_1$

| $n_1$ | 0 | 1 | 0 | 1 | 0 | 1 | 0 | 1 | 0 | 1 | 0 | 1 | 0 | 1 | 0 | 1 |
|---|---|---|---|---|---|---|---|---|---|---|---|---|---|---|---|---|
| $n_0$ | 0 | 0 | 2 | 2 | 1 | 1 | 3 | 3 | 0 | 0 | 2 | 2 | 1 | 1 | 3 | 3 |
| $k_0$ | 0 | 0 | 0 | 0 | 0 | 0 | 0 | 0 | 1 | 1 | 1 | 1 | 1 | 1 | 1 | 1 |
| $Y_2(\ )$ | 0 | 8 | 4 | 12 | 2 | 10 | 6 | 14 | 1 | 9 | 5 | 13 | 3 | 11 | 7 | 15 |

$\omega_1$

STAGE 2

| $T(\ )$ | 0 | | 4 | | 2 | | 6 | | 1 | | 5 | | 3 | | 7 | |
|---|---|---|---|---|---|---|---|---|---|---|---|---|---|---|---|---|
| $n_1$ | 0 | 0 | 1 | 1 | 0 | 0 | 1 | 1 | 0 | 0 | 1 | 1 | 0 | 0 | 1 | 1 |
| $n_0$ | 0 | 0 | 0 | 0 | 2 | 2 | 2 | 2 | 1 | 1 | 1 | 1 | 3 | 3 | 3 | 3 |
| $k_0$ | 0 | 1 | 0 | 1 | 0 | 1 | 0 | 1 | 0 | 1 | 0 | 1 | 0 | 1 | 0 | 1 |
| $Y_2(\ )$ | 0 | 1 | 8 | 9 | 4 | 5 | 12 | 13 | 2 | 3 | 10 | 11 | 6 | 7 | 14 | 15 |
| A | 0 | 1 | 2 | 3 | 8 | 9 | 10 | 11 | 4 | 5 | 6 | 7 | 12 | 13 | 14 | 15 |

$\beta_2$

| $n_2$ | 0 | 1 | 0 | 1 | 0 | 1 | 0 | 1 | 0 | 1 | 0 | 1 | 0 | 1 | 0 | 1 |
|---|---|---|---|---|---|---|---|---|---|---|---|---|---|---|---|---|
| $n_1$ | 0 | 0 | 1 | 1 | 0 | 0 | 1 | 1 | 0 | 0 | 1 | 1 | 0 | 0 | 1 | 1 |
| $n_0$ | 0 | 0 | 0 | 0 | 2 | 2 | 2 | 2 | 1 | 1 | 1 | 1 | 3 | 3 | 3 | 3 |
| $Y_3(\ )$ | 0 | 8 | 4 | 12 | 2 | 10 | 6 | 14 | 1 | 9 | 5 | 13 | 3 | 11 | 7 | 15 |

$\omega_2$  80

MEMORY ADDRESS GENERATOR FOR AN FFT

FIELD OF THE INVENTION

This invention relates in general to the field of Fourier transforms, in particular to fast Fourier transforms and more particularly to an improved memory address generator for FFTs.

BACKGROUND OF THE INVENTION

This derivation of the general Cooley-Tukey algorithm similar to that of The Fast Fourier Transform, Prentice-Hall, 1974 [E. Oran Brigham], pp 188–190. It provides the foundation for this discussion. The simple equation for the Discrete Fourier Transform (DFT) is as follows:

$$X(n) = \sum_{k=0}^{N-1} x_0(k) W^{nk} \quad n = 0, 1, 2, \ldots, N-1 \quad (1.1)$$

$$\text{where } W = e^{-j2\pi/N}$$

N is the number of points to be discretely transformed. Assume $N=R_0 R_1 R_2 \ldots R_{m-1}$ where $R_0, R_1, R_2, \ldots, R_{m-1}$ are integers, not necessarily different. The indices n and k can then be expressed in a variable radix representation:

$$n = n_{m-1}(R_0 R_1 \ldots R_{m-2}) + n_{m-2}(R_0 R_1 \ldots R_{m-3}) + \ldots + n_1 R_0 + n_0 \quad (1.2)$$

$$k = k_{m-1}(R_1 R_2 \ldots R_{m-1}) + k_{m-2}(R_2 R_3 \ldots R_{m-1}) + \ldots + k_1 R_{m-1} + k_0$$

where $$n_i = 0, 1, 2, \ldots, R_i - 1 \quad 0 \leq i \leq m-1$$
$$k_i = 0, 1, 2, \ldots, R_{m-i-1} - 1 \quad 0 \leq i \leq m-1$$

Eq. (1.1) can now be rewritten as:

$$X(n_{m-1}, n_{m-2}, \ldots, n_1, n_0) = \sum_{k_0} \sum_{k_1} \ldots \sum_{k_{m-1}} x_0(k_{m-1}, k_{m-2}, \ldots, k_1, k_0) W^{nk} \quad (1.3)$$

where $$\sum_{k_i}$$

indicates a summation over $k_i = 0, 1, 2, \ldots, R_{m-i-1}-1$ with $0 \leq i \leq m-1$.
Note that:

$$W^{nk} = W^{n[k_{m-1}(R_1 R_2 \ldots R_{m-1}) + \ldots + k_0]} \quad (1.4)$$

and the first term of the summation expands to:

$$W^{nk_{m-1}(R_1 R_2 \ldots R_{m-1})} = W^{[n_{m-1}(R_0 R_1 \ldots R_{m-2}) + \ldots + n_0] k_{m-1}(R_1 R_2 \ldots R_{m-1})}$$

$$= [W^{R_0 R_1 \ldots R_{m-1}}]^{n_{m-1}(R_1 R_2 \ldots R_{m-2}) + \ldots + n_1] k_{m-1}} \cdot W^{n_0 k_{m-1}(R_1 R_2 \ldots R_{m-1})} \quad (1.5)$$

Because $W^{R_0 R_1 \ldots R_{m-1}} = W^N = 1$, Eq. (1.5) can be written as:

$$W^{nk_{m-1}(R_1 R_2 \ldots R_{m-1})} = W^{n_0 k_{m-1}(R_1 R_2 \ldots R_{m-1})} \quad (1.6)$$

Eq. (1.4) becomes:

$$W^{nk} = W^{n_0 k_{m-1}(R_1 R_2 \ldots R_{m-1})} W^{n[k_{m-2}(R_2 \ldots R_{m-1}) + \ldots + k_0]} \quad (1.7)$$

Eq. (1.3) can now be written as:

$$X(n_{m-1}, n_{m-2}, \ldots, n_1, n_0) = \quad (1.8)$$

$$\sum_{k_0} \sum_{k_1} \ldots \left[ \sum_{k_{m-1}} x_0(k_{m-1}, k_{m-2}, \ldots, k_1, k_0) W^{n_0 k_{m-1}(R_1 \ldots R_{m-1})} \right] \times$$

$$W^{n_0 k_{m-1}(r_1 r_2 \ldots r_{m-1})} W^{n[k_{m-2}(r_2 \ldots r_{m-1}) + \ldots + k_0]}.$$

Note that the inner sum is over $k_{m-1}$ and is only a function of the variables $n_0$ and $k_{m-2}, \ldots, k_0$. Thus a new array can be defined as:

$$x_1(n_0, k_{m-2}, \ldots, k_1, k_0) = \quad (1.9)$$

$$\sum_{k_{m-1}} x_0(k_{m-1}, \ldots, k_1, k_0) W^{n_0 k_{m-1}(R_1 \ldots R_{m-1})}.$$

Eq. (1.8) can now be written as:

$$X(n_{m-1}, n_{m-2}, \ldots, n_1, n_0) = \sum_{k_0} \sum_{k_1} \ldots \quad (1.10)$$

$$\sum_{k_{m-1}} x_1(n_0, k_{m-2}, \ldots, k_1, k_0) W^{n[k_{m-2}(R_2 \ldots R_{m-1}) + \ldots + k_0]}.$$

By arguments analogous to those leading to Eq. (1.6), we obtain:

$$W^{nk_{m-2}(R_2 R_3 \ldots R_{m-1})} = W^{(n_1 R_0 + n_0) k_{m-2}(R_2 R_3 \ldots R_{m-1})} \quad (1.11)$$

The identity of Eq. (1.11) allows the inner sum of Eq. (1.10) to be written as:

$$x_2(n_0, n_1, k_{m-3}, \ldots, k_0) = \quad (1.12)$$

$$\sum_{k_{m-2}} x_1(n_0, k_{m-2}, \ldots, k_0) W^{(n_1 R_0 + n_0) k_{m-2}(R_2 R_3 \ldots R_{m-1})}.$$

Eq. (1.10) can be rewritten in the form:

$$X(n_{m-1}, n_{m-2}, \ldots, n_1, n_0) = \sum_{k_0} \sum_{k_1} \ldots \sum_{k_{m-1}} x_2(n_0, n_1, k_{m-3}, \ldots, k_0) \quad (1.13)$$

$$W^{n[k_{m-3}(R_3 R_4 \ldots R_{m-1}) + \ldots + k_0]}.$$

When Eq. (1.13) is repeatedly reduced in this manner, a set of recursive equations is obtained of the form:

$$x_i(n_0, n_1, \ldots, n_{i-1}, k_{m-i-1}, \ldots, k_0) = \quad (1.14)$$

$$\sum_{k_{m-i}} x_{i-1}(n_0, n_1, \ldots, n_{i-2}, k_{m-i}, \ldots, k_0)$$

$$W^{[n_{i-1}(R_0 R_1 \ldots R_{i-2}) + \ldots + n_0] k_{m-i}(R_i \ldots R_{m-1})}$$

$$i = 1, 2, \ldots, m.$$

Eq. (1.14) is valid provided $(R_i \ldots R_{m-1})=1$ for $i>m-1$ and $k_{-1}=0$. The final results are:

$$X(n_{m-1}, \ldots, n_0) = x_m(n_0, \ldots, n_{m-1}). \quad (1.15)$$

Note that Eq. (1.15) involves digit-reversing to yield a meaningful index.

The DFT is now termed the Fast Fourier Transform (FFT), because of the reduced calculation complexity inherent in this recursive approach. The $x_i$'s can be considered as the outputs of each stage of the FFT, with the $x_{i-1}$'s being the stage inputs.

Consider that the FFT is just a black box, with the output being some function of the input, and with some timing delay, $\Delta$ time units, from input to output. This black box must process an array of inputs, and provide an array of outputs. Each output array then immediately becomes the next input array for the black box. The arrays are input one element at a time, and are output one element at a time. After some number of passes, the box is told to stop, and to provide its final output array. The black box is required to be busy at all times, so that its processing power is fully exploited. This black box must accept input data 'simultaneously' with providing output data. That is, for every time unit, the box must both accept an input element and provide an output element, with each output element being at least partly based on an input element which was input $\Delta$ time units ago. What is needed is a method and corresponding hardware for accomplishing this, yet requiring only N words of memory for the box's use, where N is the number of elements of each array. What is also needed is a method and corresponding hardware for accomplishing this with minimum memory so that the box and its memory can be combined in a single device, even for larger FFT's, to minimize outside interfaces, and to allow the highest possible speed.

Many FFT 'black boxes' have been built in the past, yet all have skirted this problem either by providing 2XN words of memory, or by letting the black box run at 50% or less efficiency.

What is needed is a method and corresponding hardware that allows reading from AND writing to the SAME address during the aforementioned time unit. That is, the memory access involves a single read/write access during each time unit. This is more efficient than a read access followed by a write access, as only one address is required, as no extra time is necessary to allow a 2nd address to stabilize. What is further needed is a method and corresponding hardware for doing this, with just N words of memory and a single address generator, while allowing for maximum box efficiency. What is additionally needed is a capability for a programmable size FFT coupled with the minimum amount of memory for carrying out the FFT.

Note: The term 'butterfly', as used herein, sometimes means 'FFT engine', and sometimes means 'base DFT element'. The meaning is apparent when the term is taken in context.

BRIEF DESCRIPTION OF THE DRAWINGS

FIG. 1 is a FFT timing and memory with processing flow diagram representing Eqs. (5.4), (5.5) and (5.6);

FIG. 8 is a time flow diagram for a radix-4,2,2 FFT, in accordance with the teachings of the present invention;

DETAILED DESCRIPTION OF THE DRAWINGS

Figure 2:
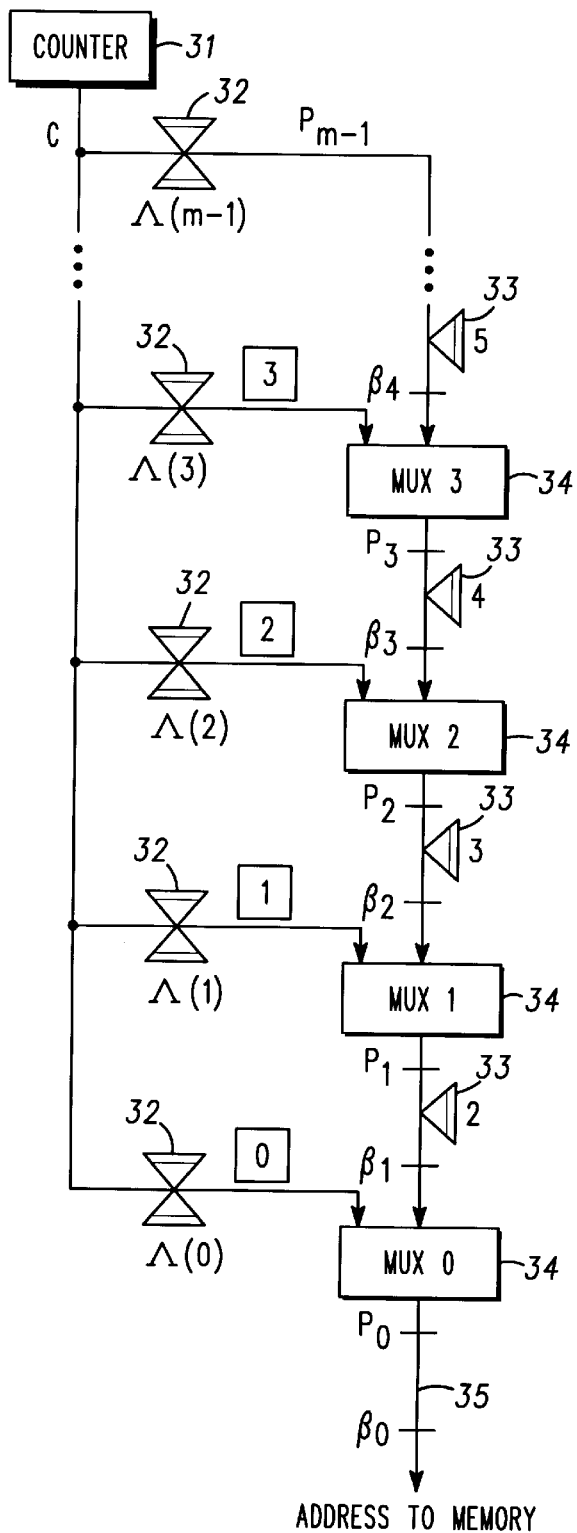
FIG. 2 is a schematic diagram of an address generator for an FFT which is non-causal, describing an implementation of Eqs. (5.14), (6.5) and (6.13), in accordance with the teachings of the present invention.

One solution is so simple that its explanation involves no knowledge of FFT's. However, this solution is not optimal. Basically, the solution is as follows: get a really fast memory. That is, during each time unit, when both an input to the box needs to be read, and an output from the box needs to be written, we need to provide first a read address to the memory, for the box input data, then a write address to the memory, for the box output data. Thus, for every time unit, the memory must be able to handle a read memory access followed by a write memory access. The memory access must be twice as short as the processing time unit for the FFT box. For time units which are very short, such as for an FFT with a pipelined engine, the memories must be very fast. This simple solution involves a read address generator AND a write address generator. The write address generator yields the same sequence of addresses as the read address generator, but lags it by $\Delta$ time units. This allows the corresponding elements of all input and output arrays to utilize the same memory address, obviously yielding a memory requirement of just N words. The write address generator could be implemented as a digital delay on the read addresses. The implementation details of the read address generator are covered later in this paper. Although not optimal, this solution is new.

§ 2. MODIFICATIONS TO THE BASIC COOLEY-TUKEY FFT ALGORITHM.

The following section begins some important modifications to the above equations. These modifications are not essential for the derivation of equations to describe a memory address generator for the FFT. However, the derivation is simplified with the modifications. First, we define a new set of arrays. Let:

$$y_0(k_{m-1}, \ldots, k_1, k_0) = x_0(k_{m-1}, \ldots, k_1, k_0) \qquad (2.1)$$

$$y_1(n_0, k_{m-2}, \ldots, k_1, k_0) = x_1(n_0, k_{m-2}, \ldots, k_1, k_0) \qquad (2.2)$$

$$y_2(n_1, n_0, k_{m-3}, \ldots, k_1, k_0) = x_2(n_0, n_1, k_{m-3}, \ldots, k_1, k_0) \qquad (2.3)$$

$$y_3(n_2, n_1, n_0, k_{m-4}, \ldots, k_1, k_0) = x_3(n_0, n_1, n_2, k_{m-4}, \ldots, k_1, k_0) \qquad (2.4)$$

etc.

That is, let:

$$y_i(n_{i-1}, \ldots n_1, n_0, k_{m-i-1}, \ldots, k_1, k_0) = x_i(n_0, n_1, \ldots, n_{i-1}, k_{m-i-1}, \ldots, k_1, k_0) \qquad (2.5)$$

This yields a new form of Eq. (1.14):

$$y_i(n_{i-1}, \ldots n_1, n_0, k_{m-i-1}, \ldots, k_1, k_0) = \qquad (2.6)$$
$$\sum_{k_{m-i}} y_{i-1}(n_{i-2}, \ldots, n_1, n_0, k_{m-i}, \ldots, k_0)$$
$$W^{[n_{i-1}(R_0 R_1 \ldots R_{i-2}) + \ldots + n_0] k_{m-i}(R_i \ldots R_{m-1})}$$

$$i = 1, 2, \ldots, m.$$

Again we define $(R_i \ldots R_{m-1}) = 1$ for $i > m-1$ and $k_{-1} = 0$. The final results are then given by:

$$X(n_{m-1}, \ldots, n_0) = y_m(n_{m-1}, \ldots, n_0) \qquad (2.7)$$

Note that Eq. (2.7), unlike Eq. (1.15), involves no digit-reversing to yield a meaningful index.
Also note that:

$$[n_{i-1}(R_0 R_1 \ldots R_{i-2}) + \ldots + n_1 R_0 + n_0] k_{m-i}(R_i \ldots R_{m-1}) =$$
$$n_{i-1} k_{m-i}(N/R_{i-1}) + [n_{i-2}(R_0 R_1 \ldots R_{i-3}) + \ldots + n_1 R_0 + n_0] k_{m-i}(R_i \ldots R_{m-1}) \qquad (2.8)$$

Thus Eq. (2.6) can be regrouped as follows:

$$y_i(n_{i-1}, \ldots, n_1, n_0, k_{m-i-1}, \ldots, k_0) = \qquad (2.9)$$
$$\sum_{k_{m-i}} [y_{i-1}(n_{i-2}, \ldots, n_1, n_0, k_{m-i}, \ldots, k_0) W^{n_{i-1} k_{m-i}(N/R_{i-1})}] \times$$
$$[W^{[n_{i-2}(R_0 R_1 \ldots R_{i-3}) + \ldots + n_1 R_0 + n_0](R_i \ldots R_{m-1})}]^{k_{m-i}}$$

$$i = 1, 2, \ldots, m.$$

Once again we define $(R_i \ldots R_{m-1}) = 1$ for $i > m-1$ and $k_{-1} = 0$.

Recalling that $W = e^{-j2\pi/N}$, we note that the summation of the first square brackets' contents in Eq. (2.9) is the equation for an $R_{i-1}$-point DFT. That is, the radix used is $R_{i-1}$. The remainder of the summation can be considered as twiddle factors. The twiddle-factor concept is not new, but the twiddle-index concept covered next is new.

This DFT is still termed the Fast Fourier Transform (FFT). Only the indices have been changed. Now the $y_i$'s can be considered as the outputs of each stage of the FFT, with the $y_{i-1}$'s being the stage inputs.

§ 3. THE TWIDDLE FACTOR INDICES

We referred to the following portion of Eq. (2.9) as the twiddle factors:

$$[W^{[n_{i-2}(R_0 R_1 \ldots R_{i-3}) + \ldots + n_1 R_0 + n_0](R_i \ldots R_{m-1})}]^{k_{m-i}} i = 1, 2, \ldots, m$$

We now concentrate on the exponent, excluding $k_{m-i}$. Consider:

$$[n_{i-2}(R_0 R_1 \ldots R_{i-3}) + \ldots + n_1 R_0 + \qquad (3.1)$$
$$n_0](R_i \ldots R_{m-1}) = n_{i-2}(R_{i-3} R_{i-4} \ldots R_0 R_i R_{i+1} \ldots R_{m-1}) +$$
$$n_{i-3}(R_{i-4} R_{i-5} \ldots R_0 R_i R_{i+1} \ldots R_{m-1}) \ldots + n_0(R_i R_{i+1} \ldots R_{m-1}).$$

Thus:

$$[n_{i-2}(R_0 R_1 \ldots R_{i-3}) + \ldots + n_1 R_0 + n_0](R_i \ldots R_{m-1}) = \qquad (3.2)$$
$$(\emptyset_{i-1}, n_{i-2}, n_{i-3}, \ldots, n_0, \emptyset_i, \emptyset_{i+1}, \ldots, \emptyset_{m-1}),$$

in a mixed-radix format, where each $\emptyset_j$ is zero, base $R_j$, and each $n_j$ is a base $R_j$ digit.

Now we can define a new twiddle function, with a meaningful index:

$$T(\emptyset_{i-1}, n_{i-2}, n_{i-3}, \ldots, n_0, \emptyset_i, \emptyset_{i+1}, \ldots, \emptyset_{m-1}) =$$
$$W^{[n_{i-2}(R_0 R_1 \ldots R_{i-3}) + \ldots + n_1 R_0 + n_0](R_i \ldots R_{m-1})} = W^{(\emptyset_{i-1}, n_{i-2}, n_{i-3}, \ldots, n_0, \emptyset_i, \emptyset_{i+1}, \ldots, \emptyset_{m-1})} \qquad (3.3)$$

so that the twiddle factors become:

$$[T(\emptyset_{i-1}, n_{i-2}, n_{i-3}, \ldots, n_0, \emptyset_i, \emptyset_{i+1}, \ldots, \emptyset_{m-1})]^{k_{m-i}}$$

From Eq. (3.3), note that:

$$T(x) = W \qquad (3.4)$$

Eq. (2.9) can now be written as:

$$y_i(n_{i-1}, \ldots, n_1, n_0, k_{m-i-1}, \ldots, k_0) = \qquad (3.5)$$
$$\sum_{k_{m-i}} [y_{i-1}(n_{i-2}, \ldots, n_1, n_0, k_{m-i}, \ldots, k_0) W^{n_{i-1} k_{m-i}(N/R_{i-1})}] \times$$
$$[T(\emptyset_{i-1}, n_{i-2}, n_{i-3}, \ldots, n_0, \emptyset_i, \emptyset_{i+1}, \ldots, \emptyset_{m-1})]^{k_{m-i}}$$

$$i = 1, 2, \ldots, m.$$

Note, from the definitions of the n and k digits in Eq. (1.2), that:

$n_j$ is a digit in base $R_j$. $k_j$ is a digit in base $R_{m-j-1}$.
Recall that $\emptyset_j$ is a zero digit in base $R_j$.

Thus the corresponding (position-wise) digits for the $y_i$ (output) and T indices are in the same base.

From Eq. (3.5), we can see that the indices for the twiddles are closely related to the indices for the stage outputs. In particular, note that the twiddle indices are the output indices, with some digits masked out, i.e. forced to zero. This allows for a very simple twiddle index generator, where the position numbers (yet to be covered), time-shifted versions of the output indices, are logical ANDed with a mask word, different for each stage, to yield the twiddle indices. The twiddle index generator works in parallel with the to-be-determined FFT memory address generator to provide the FFT engine with the necessary inputs. A more detailed discussion of the twiddle index generator is provided in § 10.

§ 4. FFT FLOW DIAGRAMS: TIMING IS IGNORED

For the reader who is unfamiliar with the textbook flow diagrams used in almost every other discussion of FFT's, no such familiarity is necessary here. For the reader who possesses the familiarity, an explanation for the lack of flow diagrams here is appropriate.

Recall that these flow diagrams represent the flow of data between memory locations. Timing is ignored in these flow diagrams. Typically, one assigns the indices in a flow diagram according to Eq. (1.14), where the input indices equal the output indices, so that the indices can be interpreted as memory addresses or registers. This facilitates the explanation of why an ordered-input FFT yields a reverse-digit output. However, this ordered-input yielding a reverse-digit output is true memory-wise (MW), not timing-wise (TW). The same is true of a reverse-digit input yielding an ordered output. This digit-reversing property, whether it involves a fixed radix or mixed radices, assumes an in-place algorithm, whereby the memory for storing the outputs of each stage are the identical locations whence came the inputs.

In this discussion, we do care about memory, as we wish to use the minimum possible, i.e. the 'in-place' amount. We also very much care about time, as we wish to understand how to compensate for the processing delay through a given FFT engine. We wish to maintain maximum FFT engine efficiency, inherently a timing problem.

Our interest centers around the following scenario:
- Start with a given FFT pipelined engine, with a given pipeline delay in engine cycles.
- Add an "in-place" amount of memory, i.e. N complex words deep.
- Require that the memory accept data and provide data every FFT engine cycle.
- Require that the FFT engine duty cycle be 100%, i.e. no wasted time.
- Require a memory addressing scheme which allows the above parameters.

Specifically, the memory addressing scheme is developed in this discussion.

§ 5. THE DEVELOPMENT OF A NEW TOOL: FFT TIME FLOW DIAGRAMS

Consider, as an example, using Eq. (3.5), a 3-stage (m=3) FFT:

$$y_1(n_0, k_1, k_0) = \sum_{k_2} [y_0(k_2, k_1, k_0) W^{n_0 k_2 N/R_0}] \times [T(\emptyset_0, \emptyset_1, \emptyset_2)]^{k_2} \quad (5.1)$$

$$y_2(n_1, n_0, k_0) = \sum_{k_1} [y_1(n_0, k_1, k_0) W^{n_1 k_1 N/R_1}] \times [T(\emptyset_0, n_1, \emptyset_2)]^{k_1} \quad (5.2)$$

$$y_3(n_2, n_1, n_0) = \sum_{k_0} [y_2(n_1, n_0, k_0) W^{n_2 k_0 N/R_2}] \times [T(\emptyset_2, n_1, n_0)]^{k_0}. \quad (5.3)$$

Consider further that the stages are radix 4,3,2 for a 24-point FFT. That is, the 0th stage is radix 4, the next stage is radix 3, and the last stage is radix 2:

$$y_1(n_0, k_1, k_0) = \sum_{k_2=0}^{3} [y_0(k_2, k_1, k_0) W^{6 n_0 k_2}] \times ([T(\emptyset_0, \emptyset_1, \emptyset_2)])^{k_2} \quad (5.4)$$

$$y_2(n_1, n_0, k_0) = \sum_{k_1=0}^{2} [y_1(n_0, k_1, k_0) W^{8 n_1 k_1}] \times ([T(\emptyset_0, n_0, \emptyset_2)])^{k_1} \quad (5.5)$$

$$y_3(n_2, n_1, n_0) = \sum_{k_0=0}^{1} [y_2(n_1, n_0, k_0) W^{12 n_2 k_0}] \times [T(\emptyset_2, n_1, n_0)]^{k_0}. \quad (5.6)$$

We assume that, in the course of our FFT algorithm, the inputs to each radix $R_i$-DFT (a.k.a. the butterfly) are provided to the FFT engine timing-wise (TW) before any inputs for any other butterfly. This assumption is appropriate for obvious reasons. Referring to Eq. (3.5), note that the output indices for each butterfly are different only in the most significant index digit, i.e. digit $n_{i-1}$. This is the only restriction on the output index with our assumption.

Note from Eq. (3.5), or from Eqs. (5.4), (5.5), and (5.6), that the input indices for each stage are a circular rotate left of the upper idigits in the output indices, where the stage number is i-1, i=1,2, . . . , m.

Figure 1:
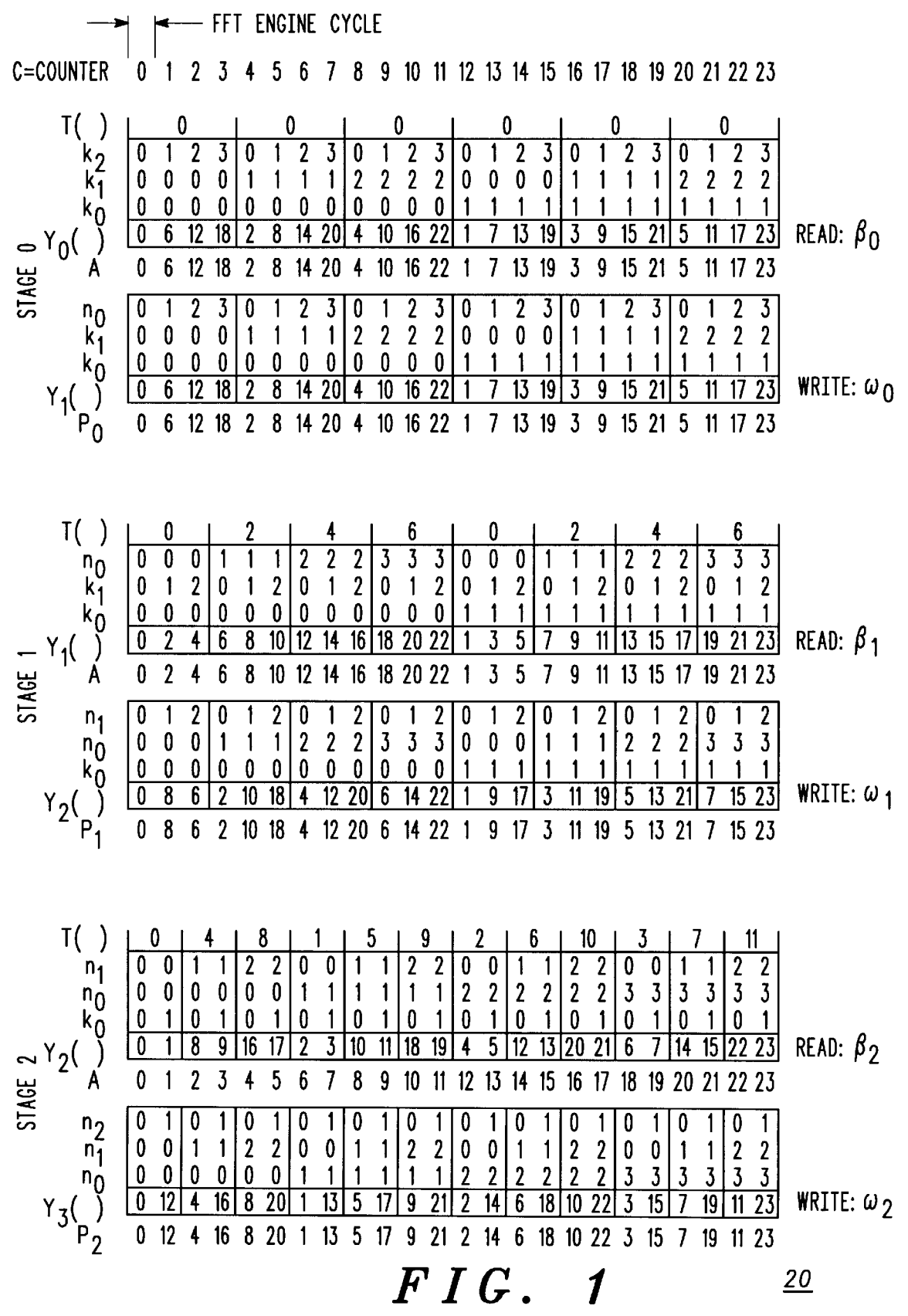

Eqs. (5.4), (5.5), and (5.6) are represented in 'FFT timing and memory with processing flow' diagram 20 shown in FIG. 1. Henceforth, such diagrams are called FFT time flow diagrams for short. This diagram is particularly messy because index digits, not normally shown explicitly in such diagrams, are shown here. The index digits are shown so that the reader can more easily see the logic in the generation of the FFT time flow diagrams.

Earlier in time is towards the left of the diagram. The different stages are shown going down the diagram. Actually, timing-wise, these stages should be back-to-front against each other. At the end of one stage we immediately begin the next. For small FFT'S, we could show all stages back-to-front, but this becomes impractical for larger FFT'S, so an appropriate convention is adopted here.

The top of FIG. 1 shows the output of a counter; this represents the FFT engine cycle number for each FFT stage. Corresponding to this counter output, and listed under each stage, are the position numbers $P_S$ for each stage S. These position numbers are defined as identical to the stage output indices, except that they are always listed simultaneously with the input indices, independent of processing delay. This is explained more later.

The butterfly input and output indices are shown grouped within 'boxes', with the box size indicating the radix of the butterfly. For radix-4, for example, the inputs and outputs are shown in groups of 4. This 'boxing' convention then explicitly conveys the radix for each stage.

Recall that the output indices for each butterfly are different only in the most significant index digit, i.e. digit $n_{i-1}$ in Eq. (3.5). One ordering scheme in which $R_{i-1}$ consecutive numbers, within a particular section corresponding to our butterfly, differ in only the most significant digit (MSD) is the 'reverse-count-digit order' for the counter output. This is not the only possibility, but it is the ordering adopted here. Thus the output indices for each stage are listed in reverse-count-digit order.

This 'reverse-count-digit' (RCD) order is a new concept, and is explained here. An explanation of a reverse-count-digit operator when operating on ordered non-negative integers, such a counter's outputs, is given first. Other number sequences as operands are covered next. Normally, when one increments from one number to the next, whether in a fixed base or in mixed bases, he adds one to the least significant digit (LSD). If the digit overflows (that is, if a new value for that digit equals the base of the digit), then the digit is cleared to 0, and the overflow, or 1, is added to the next MORE significant digit. This overflow, for each digit, is always carried to the next more significant digit. These numbers then represent ordered non-negative integers. However, a x reverse-count-digit operator, when operating on ordered non-negative integers, adds 1 to the most significant digit (MSD) of the operator output as the input is incremented. All else is the same, except that when overflow occurs, the digit is cleared, and 1 is added to the next LESS significant digit. This overflow carry pattern, for each digit, is always to the next less significant digit. Thus this reverse-count-digit ordering looks different with each stage, as the bases of the index digits are in a different order for each stage. That is, for our example, the bases of the digits, from MSD to LSD, for the stage 0 output radices, are 4,3,2; for the stage 1 output radices, are 3,4,2; and for the stage 2 output radices, are 2,3,4. This 'counting' is explicitly shown with the listings of all output index digits. The decimal values of these mixed-base indices are also shown.

Let C represent any one element of the time-ordered sequence of non-negative integers. Call the reverse-count-digit operator ⇔, and the reverse-digit operator ↔. In reverse digit order, the digits themselves are reversed, independent of number sequencing.

Thus the RCD discussion so far can be expressed in recursive-equation form as:

$$\Leftrightarrow_s 0 = 0 \quad (5.7)$$
$$\Leftrightarrow_s (C+1) = \leftrightarrow_s ((\leftrightarrow_s (\Leftrightarrow_s C)) + 1) \text{ for } C \geq 0$$
$$0 \leq s \leq m-1.$$

The s subscript is shown to indicate dependence on the bases of the individual digits. Specifically, s represents stage number for our discussion, as the stage number uniquely determines the order of the bases for index digits, given that specific radices are used in a particular order in the FFT. As an example, consider:

$$C=1$$

Consider further that C is represented in a 3-digit format, with digit 2 (the MSD) in base 2, digit 1 in base 3, and digit 0 (the LSD) in base 4. Then, from Eq. (5.7):

$$\Leftrightarrow 1 = \leftrightarrow ((\leftrightarrow(0_2,0_3,0_4))+1) \Leftrightarrow 1 = \leftrightarrow(0_4,0_3,1_2) = (1_2,0_3,0_4) = 12$$

However, if C is represented in a 3-digit format, with digit 2 (the MSD) in base 4, digit 1 in base 3, and digit 0 (the LSD) in base 2. Then, from Eq. (5.7):

$$\Leftrightarrow 1 = \leftrightarrow ((\leftrightarrow(0_4,0_3,0_2))+1) \Leftrightarrow 1 = \leftrightarrow(0_2,0_3,1_4) = (1_4,0_3,0_2) = 6$$

This clearly shows that different digit bases yield different results for the RCD version of a particular C value.

Note that if the radices for all stages are the same, then the reverse-count-digit order of C is the same as the more famous reverse-digit order.

To yield a complete definition, one should consider the reverse-count-digit version of a number which is already in reverse-count-digit format. We desire that the reverse-count-digit of the reverse-count-digit of x be x. This gives rise to the following, more general definition of a reverse-count-digit operator.

Assume a sequence of numbers D (represented as u digits, $d_{u-1} \ldots d_0$, in u radices, $R_{u-1} \ldots R_0$, not necessarily different) follows a pattern such that the digits representing the numbers can be rearranged so that the number pattern becomes the ordered non-negative integers. Call this 'rearrange' function ρ, so that ρ(D) are the ordered non-negative integers. The inverse rearrange function is $\rho^{-1}$, so that $\rho^{-1}(\rho(D))=D$. It is important to note that ρ and $\rho^{-1}$ do nothing but arrange digits, and that $\rho^{-1}$ is uniquely defined by ρ. Then the reverse-count-digit operator can be extended to cover this case as follows:

$$\Leftrightarrow_s(D) = \rho^{-1}(\Leftrightarrow_s(\rho(D))). \quad (5.8)$$

For the reverse-count-digit operator, the bases of the corresponding (in position) input and output digits are the same. As alluded to previously, for an input number sequence such as the ordered non-negative integers, there are an infinite number of base (radix) combinations which can be used to represent the number sequence. Thus the reverse-count-digit format of such number sequences is not uniquely defined until we specify the number of digits and the input radices in order, such as from MSD to LSD.

For our FFT, we know the number of digits is the number of FFT-processing stages. Also, from Eq. (3.5) and the comments immediately following Eq. (3.5), we know the ordering of the index digit bases for each stage. If the stage number is S, $0 \leq s \leq m-1$, and we define Λ as an operator which yields the bases of the stage S output index digits in order from MSD to LSD, then:

$$\Lambda(0) = R_0, R_1, R_2, R_3, \ldots, R_{m-1}, \quad (5.9)$$

$$\Lambda(1) = R_1, R_0, R_2, R_3, \ldots, R_{m-1}, = \Lambda(0) \quad (5.10)$$
with upper 2 radices CRR, $$\Lambda(2) = R_2, R_1, R_0, R_3, \ldots, R_{m-1} = \Lambda(1) \quad (5.11)$$
with upper 3 radices CRR, $$\vdots$$

$$\Lambda(m-1) = R_{m-1}, R_{m-2}, \ldots, R_1, R_0 = \Lambda(m-2) \quad (5.12)$$
with upper m radices CRR, or, in general for $s > 0$ $$\Lambda(s) = R_s, R_{s-1}, \ldots, R_0, R_{s+1}, R_{s+2}, \ldots, R_{m-1} = \Lambda(s-1) \quad (5.13)$$
with upper $s + 1$ radices CRR
$$1 \leq s \leq m-1,$$

where CRR=circularly rotated right.

We can now state more specifically that a subscript of s on ⇔ says that the digit bases are given by Λ(s), per Eq. (5.13).

Also, a number in reverse-count-digit format is not typically shown with individual digits. Rather, the decimal equivalent is given. This actually helps when feeding the output of one reverse-count-digit (RCD) operator, with a particular set of bases assumed, into another, with another set of bases assumed. The conversion of the intermediate number from one set of bases to the other is most easily done, for humans, by an initial conversion into some fixed base anyway. This ends the RCD description.

The output indices are uniquely defined with reverse-count-digit ordering. The output indices are the same as the $P_s$'s Thus we can write:

$$P_s = \Leftrightarrow_s C \quad (5.14)$$

The input indices are uniquely determined by the output indices according to Eq. (3.5) or Eqs. (5.4), (5.5), and (5.6). Thus we can list the input indices for each stage. Specifically, according to Eq. (5.4) for stage 0, the input indices (the indices for yo) are the same as the output indices (the indices for ye). From Eq. (5.5), for stage 1, the input indices are the output indices with the upper 2 digits circularly rotated left. From Eq. (5.6), for stage 2, the input indices are the output indices with the upper 3 digits circularly rotated left.

We can see from Eq. (3.5) that this pattern would continue for FFT's with more stages. That is, for stage S, the input indices are the output indices with the upper s+1 digits circularly rotated left. This is referred to as the 'R' function later.

The twiddle indices are also dictated by Eqs. (5.4), (5.5), and (5.6). These indices are listed across the top of each stage.

As a result of looking at the first FFT time flow diagram, we see that we have yet to cover an important topic. That topic is memory address generation, our ultimate topic for this discussion. Before discussing how they're generated, first we discuss what the addresses mean. Look at stage 0. Note that, simultaneous with reading $y_0(0)$, we are writing $y_1(0)$. As the address is constant throughout the engine cycle, the reading of $y_0(^0)$ must occur prior to the writing of $y_1(O)$, as otherwise the desired value would already be erased. This means that, during each FFT engine cycle, we are required to perform a single read/write memory cycle.

The required memory addresses A are explicitly shown in the FFT Time Flow diagram. Note that, implicit in the addressing for stage 0, we have assumed that the original input data is stored in order in the memory. That is, $y_0(^0)$ is stored in memory address 0, $y_0(1)$ is stored in address 1, ..., $y_0(23)$ is stored in address 23. Note that the final outputs are stored in reverse-digit order in the memory. That is, $$y_3(0) = y_3(0_2, 0_3, 0_4) \text{ is stored in address } (0_4, 0_3, 0_2) = 0$$

$$y_3(1) = y_3(0_2, 0_3, 1_4) \text{ is stored in address } (1_4, 0_3, 0_2) = 6$$

$$\vdots$$

$$y_3(6) = y_3(0_2, 1_3, 2_4) \text{ is stored in address } (2_4, 1_3, 0_2) = 14$$

$$\vdots$$

$$y_3(23) = y_3(1_2, 2_3, 3_4) \text{ is stored in address } (3_4, 2_3, 1_2) = 23.$$

But, timing-wise, the original inputs and final outputs are both in reverse-count-digit order (or reverse digit order, if a constant radix is used). Hopefully this result is satisfying to those familiar with textbook FFT flow diagrams, which should more explicitly be called FFT memory flow diagrams. Textbook FFT flow diagrams do not include time, but our FFT time flow diagrams do include memory and time.

Note that the FFT engine is kept busy at all times; we always see both an input and an output every FFT engine cycle. Note also that to calculate $y_1(0)$, all 4 inputs ($y_0(O)$, $y_0(^6), y_0(^{12})$, and $y_0(^{18})$) are required by the butterfly. But $y_1(0)$ is shown as an output before 3 of the 4 required values are available as inputs. This is not possible; i.e. this FFT time flow diagram is considered non-causal, and is labeled as such. This provides an interesting point. This FFT time flow diagram shows that our memory-ordered input to memory-reverse-digit output, when employing the in-place algorithm, and when utilizing a single address for each read/write cycle, is non-causal for an FFT engine with 100% efficiency. Most of us would be hard pressed to realize this when staring at a textbook flow diagram. Later, we will find a simple way to make our FFT time flow diagrams causal. But we will also see that a memory-order input does not yield a memory-reverse-digit output for the causal case, when utilizing 100% FFT engine efficiency and a single address for each FFT engine cycle (read/write cycle). However, for the causal case timing-wise, we will see that the FFT inputs and the FFT outputs are still in reverse-count-digit order.

The $\beta$'s and $\omega$'s are the read and write indices, respectively, for each stage. This is explained in § 6.

It is important to note here that much of FIG. 1 is considered unnecessary for an FFT time flow diagram. For example, the labeling becomes unnecessary for someone intimately familiar with the position-versus-meaning of the numbers used. The stage output 'boxing' is always uniquely determined by the stage input 'boxing', so the stage output boxing needn't be explicitly shown. The individual index digits needn't be shown, as the index values provide the required index information. Thus future FFT time flow diagrams will have a much simpler appearance, but the pertinent labels will be shown as required for this discussion.

§ 6. THE ADDRESS GENERATOR: NON-CAUSAL VERSION

Still looking at FIG. 1, notice that, for stage 0, the memory addresses must be such that we can read the input data in reverse-count-digit order. Assuming that the original data is stored in the memory in natural order (which is an assumption we maintain for the duration of this discussion), then the stage 0 memory addresses must be in reverse-count-digit order. These addresses are shown in FIG. 1.

For stage 1, the read indices dictate what the addresses must be. These read indices are the same as the write indices for the previous stage, stage 0, just in a different order. Thus we need to look back at stage 0, to see where the data for each write index is stored, then use that stage 0 address as the address for stage 1.

Likewise, for stage 2, the read indices dictate what the addresses must be. These read indices are the same as he write indices for the previous stage, stage 1, just in a different order. Thus we need to look back at stage 1, to see where the data for each write index is stored, then use that stage 1 address as the address for stage 2.

For example, if we wish to determine the address for reading $y_2(^4)$ during stage 2, we look at where $y_2(^4)$ was written in stage 1. We see that, in stage 1, $y_2(^4)$ is written to the same address from which we read $y_1(12)$. To determine this address, we go back to stage 0, and note that $y_1(12)$ is written to the same address from which we read $y_0(12)$. Thus '12' is our answer; i.e. the address from which we can read $Y_2(^4)$ during stage 2. We see that this address is also where the final FFT output $Y_3(2)$ is stored. This same approach will be applied later to the causal version.

To express the above address generation method in equation form, let:

$$\text{stage 0 read indices} = \beta_0 = \Re(P_0) \quad (6.1)$$

$$\text{stage 1 read indices} = \beta_1 = \Re(P_1) \quad (6.2)$$

$$\text{stage 2 read indices} = \beta_2 = \Re(P_2) \quad (6.3)$$

or, in general, for an m-stage FFT:

$$\text{stage s read indices} = \beta_s = \Re(P_s) \quad (6.4)$$

That is, let the read indices be expressed as functions of the position numbers.

Now recall the meaning of the $\Re$ functions. That is, $\Re(P_j)= P_j$ with the upper $j+1$ digits circularly rotated left (6.5)

Also let:

stage 0 write indices=$\omega_0$, stage 1 write indices=$\omega_1$,
stage 2 write indices=$\omega_2$, or, in general stage s write indices=$\omega_s$.

Consider that for stage 1, we can determine the address for a given $P_1$ value by determining the $P_0$ value that must correspond to the same address. Of course, the $P_0$ value is the address. As the write indices for stage 0 represent the same memory location as the read indices for stage 1, it follows that the correspondence memory-wise must be:

$$\omega_0 = \beta_1,$$

or $$\omega_0 = \Re(P_1) \tag{6.6}$$

Likewise:

$$\omega_1 = \Re(P_2) \tag{6.7}$$

or, in general:

$$\omega_{s-1} = \Re(P_s) \tag{6.8}$$

In this, our non-causal example, $\omega_s = P_s$, so:

$$P_0 = R_1(P_1), \tag{6.9}$$

$$P_1 = R_2(P_2), \tag{6.10}$$

$$\vdots$$

$$P_{s-1} = R_s(P_s). \tag{6.11}$$

Thus:

$$P_0 = R_1(R_2(P_2)), \tag{6.12}$$

which can be generalized as:

$$P_0 = \Re(\Re(\Re(\ldots \Re(P_s)))) \quad 1 \leq s \leq m-1 \tag{6.13}$$

for stage s of an m-stage FFT. As this discussion did not make use of the radices utilized in FIG. 1, Eq. (6.13) is valid for an FFT with any radix/radices.

The three Eqs. (5.14), (6.5) and (6.13) lead directly to address generator implementation 30 shown in FIG. 2. Address generator 30 is for an FFT which is non-causal, but it provides a foundation for the causal version. Address generator 30 comprises counter 31, position number generators 32, circular-rotate-left-upper-j-digits-by-one-position operators 33, multiplexers 34 and memory address output 35, interconnected as shown, to provide addresses for the non causal FFT. Position number generators 32 act as reverse-count-digit operators 32, and circular-rotate-left-upper-j-digits-by-one-position operators 33 are also known as digit shifters 33.

Figure 9:
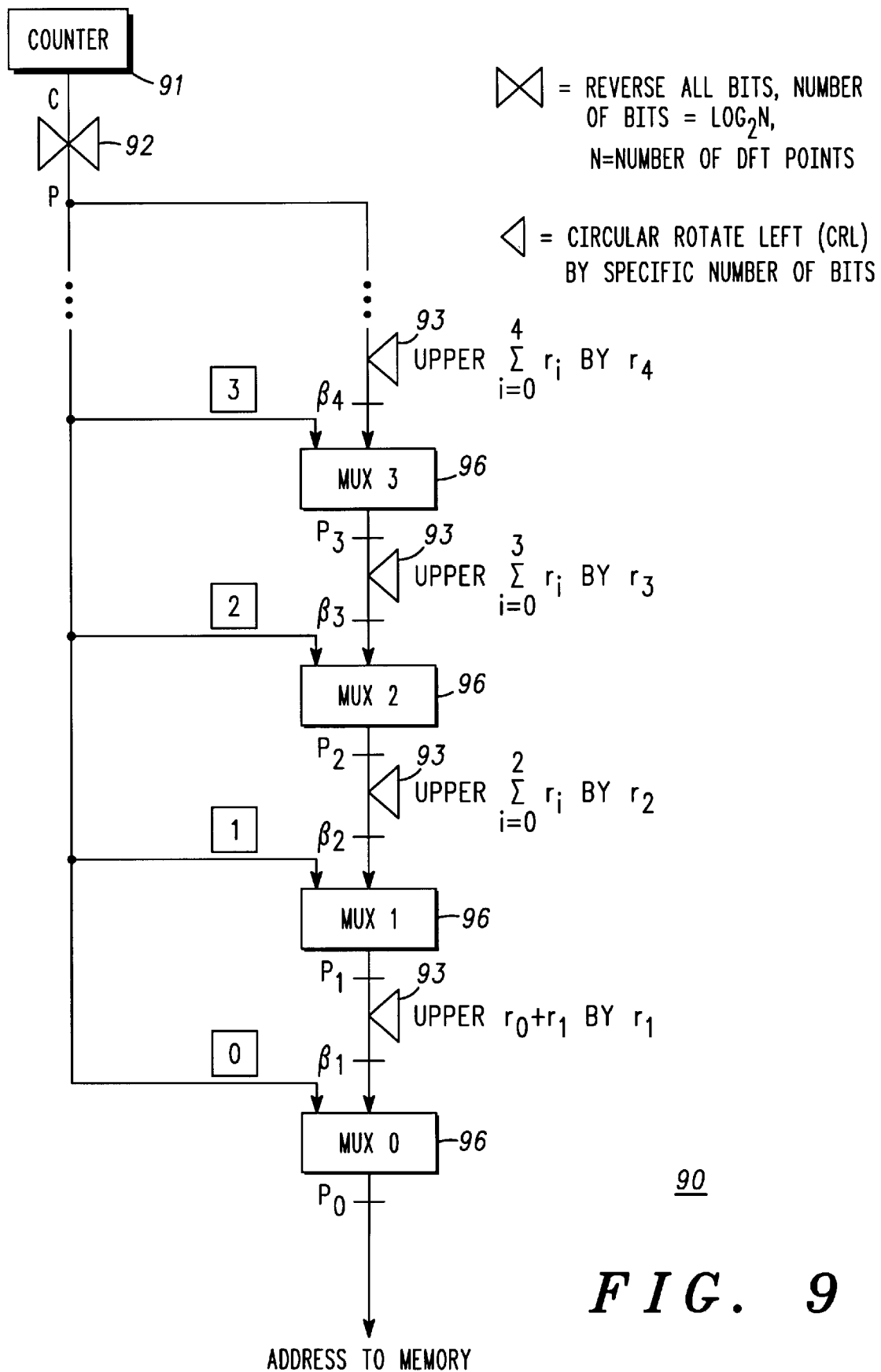
FIG. 9 is a schematic diagram of an address generator implementation of Eqs. (6.13), (9.1.1), and (9.1.3), in accordance with the teachings of the present invention.
Figure 12:
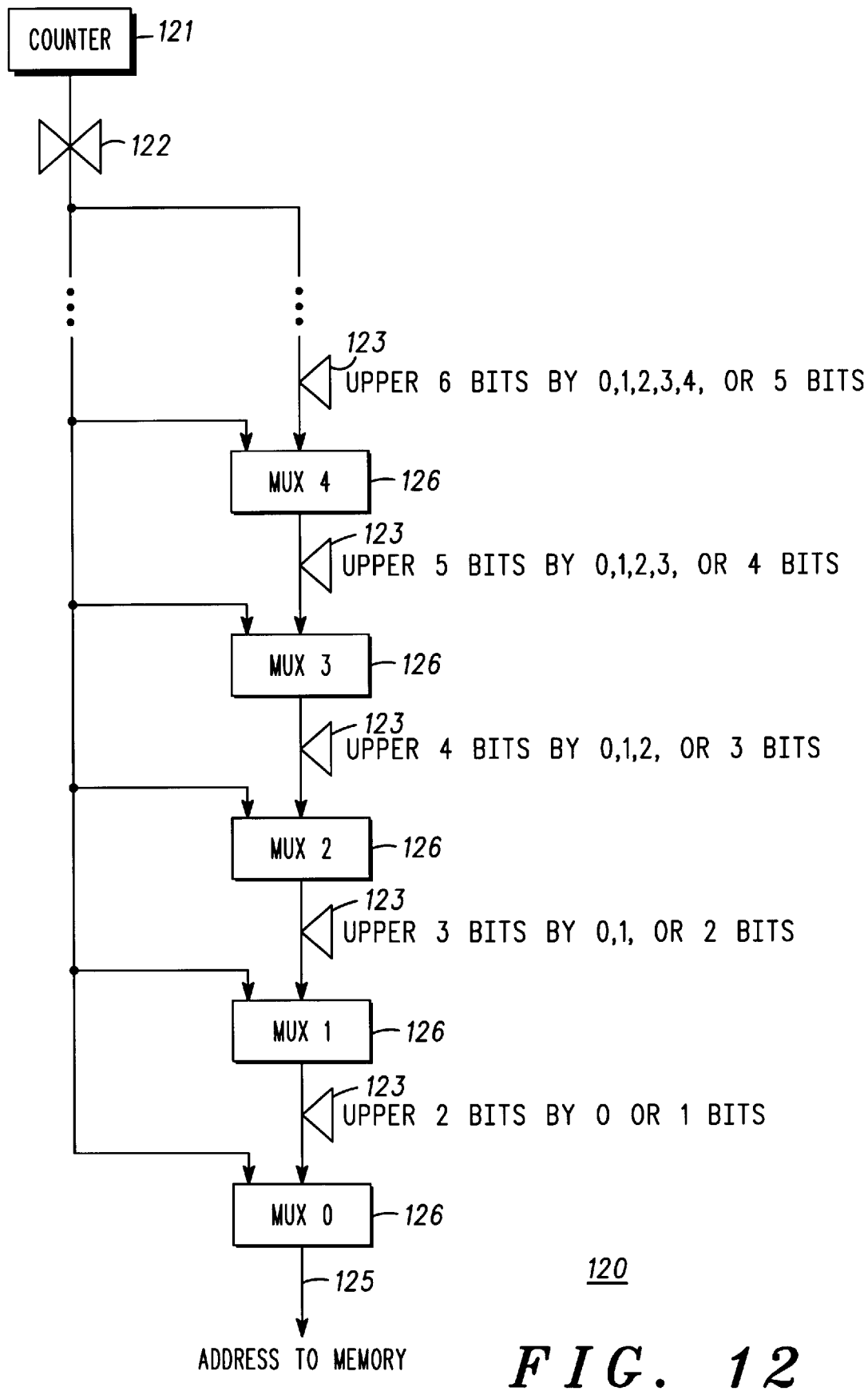
FIG. 12 is a schematic diagram of a non-causal version of an any-power-of-2-radix-order address generator, in accordance with the teachings of the present invention.
Figure 14:
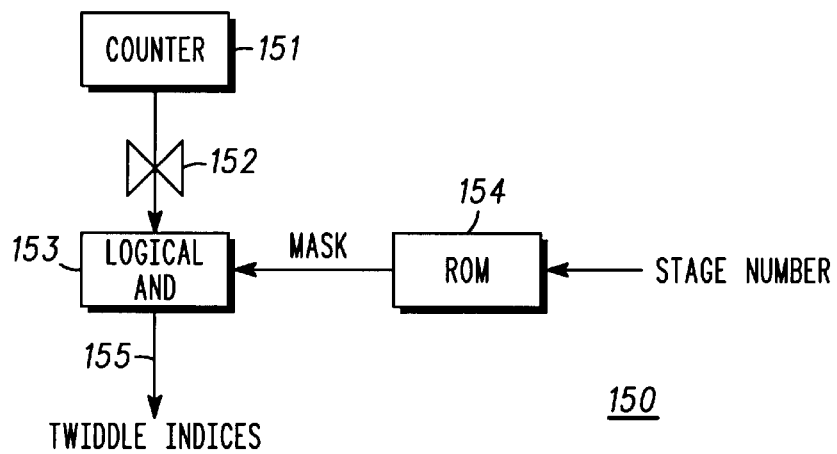
FIG. 14 is a schematic diagram of a twiddle index generator for a power-of-2 radices FFT (showing a single reverse-binary block, rather than several reverse-count-digit blocks, one for each stage), in accordance with the teachings of the present invention.

For this paragraph, we take a slight deviation from deriving the optimal FFT address generator. This is just to clarify an idea stated previously, where the reader was provided with few associated details. Recall § 1, where we stated the existence of a very simple, but non-optimal solution for our FFT address generator, one requiring a very fast memory. Separate read and write addresses need to be maintained for this solution, a condition which renders FIG. 2 as a causal implementation for the read address generator. The write address generator must then provide the same sequence of addresses as the read address generator, just delayed by $\Delta$ time units, where $\Delta$ is the FFT engine processing delay. Although FIGS. 9, 12, and 14 are yet to be discussed, these contents of FIGS. 9, 12, and 14 are also rendered causal as possible read address generators for the simple solution.

§ 7. THE ADDRESS GENERATOR: CAUSAL VERSION

Figure 3:
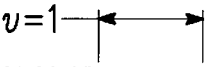
FIG. 3 is an FFT time flow diagram for a radix-4,3,2 FFT; i.e., a 24-point FFT.

Consider now FIG. 3, which shows FFT time flow diagram 40 for a radix-4,3,2 FFT; i.e., a 24-point FFT. Note that this same description applies to FIG. 1. However, FIG. 3 is for a causal FFT. Note that the output indices have been shifted to the right, i.e. later in time, by just enough so that no output is produced prior to the availability of the necessary inputs. For an FFT stage of radix R, the minimum time shift value, a.k.a. the offset, in FFT engine cycles is R-1. Of course, the actual offset for a particular FFT engine might be greater than R-1, and probably will be. Any offset $\geq R_{max}-1$ yields a causal FFT, where $R_{max}$ is the largest radix used for the FFT. For our example, $R_{max}$ is 4, and the offset is 3, so we have a causal FFT.

Figures 4, 6:
FIG. 4 is an FFT time flow diagram for an FFT like that of FIG. 3, except the offset is now 4, rather than 3.
FIG. 6 is an FFT time flow diagram of an additional stage which, when appended to FIG. 4, yields the FFT flow diagram for a final time-ordered output, in accordance with the teachings of the present invention.

FIG. 4 shows FFT time flow diagram 42. FIG. 4 can be described likewise to FIG. 3, except the offset is now 4, rather than 3. Note that the time-ordering of indices for both the initial FFT inputs and final FFT outputs is reverse-count-digit format. The initial inputs are in order memory-wise, but the memory-wise ordering of the final outputs has no apparent pattern. This is true for both FIGS. 3 and 4. Note that for both FIGS. 3 and 4, the position numbers have been extended to cover the new write-index time regions, 'offset' engine cycles long. This region is labeled 'v=1' for reasons given later.

Although the addressing patterns are not apparent, the patterns do have to be discerned, so that we might generate the addresses without too much complexity. Luckily, we have already discerned most of the pattern, from the non-causal version.

As for the non-causal version, $$stage\ 0\ read\ indices = \beta_0 = \Re(P_0) \tag{7.1}$$

$$stage\ 1\ read\ indices = \beta_1 = \Re(P_1) \tag{7.2}$$

$$stage\ 2\ read\ indices = \beta_2 = \Re(P_2) \tag{7.3}$$

or, in general, for an m-stage FFT $$stage\ s\ read\ indices = \beta_s = \Re(P_s) \quad 0 \leq s \leq m-1 \tag{7.4}$$

That is, the read indices are expressed as the same functions of the position numbers as for the non-causal case:

$$stage\ 0\ write\ indices = \omega_0\text{'s},$$

$$stage\ 1\ write\ indices = \omega_1\text{'s},$$

$$stage\ 2\ write\ indices = \omega_2\text{'s},$$

or, in general:

$$stage\ S\ write\ indices = \omega_s.$$

Also as for the non-causal case, per the same reasoning:

$$\omega_0 = R_1(P_1), \tag{7.5}$$

$$\omega_1 = R_2(P_2), \tag{7.6}$$

$$\vdots$$

$$\omega_{s-1} = R_s(P_s). \tag{7.7}$$

That is, the stage s write indices represent the same memory locations as the stage s+1 read indices. ($\omega_s = \beta_{s+1}$)

We desire to express the $P_s$'s as a function of the $\omega_s$'s. Looking at FIG. 1, note that the reverse-count-digit version of both $P_5$ and 6) is the non-negative integers. As the ordering of both has remained the same in FIGS. 3 and 4, that the reverse-count-digit version of both $P_s$ and $\omega_s$ is the non-negative integers must still be true. However, the $\omega_s$ values have been shifted by 'offset' FFT engine cycle counts. Thus we can see that:

$$\Leftrightarrow_s(P_s)=\Leftrightarrow_s(\omega_s)+\Delta$$

where $$\Delta = \text{offset} \tag{7.8}$$

with the exception of the 'v=1' region. Here we can see that the right side of Eq. (7.8) yields a number bigger than N, the number of points in the FFT. In this region, and only in this region for each stage, we can say that an overflow bit $\nu$ equals 1 when calculating the right side of Eq. (7.8). Otherwise, the value of $\nu$ is 0. It can be seen that Eq. (7.8) should be modified as follows:

$$\Leftrightarrow_s(P_s)=\Leftrightarrow_s(\omega_s)+\Delta, \text{ for } \nu_s=0, \Leftrightarrow_{2+1}(P_{s+1})=\Leftrightarrow_s(\omega_s)+\Delta-N, \text{ for } \nu_s=1 \tag{7.9}$$

Note when $\nu_s=0$, for $\omega_s$, the corresponding P in Eq. (7.9) is P, but when $\nu_{s=1}$ the corresponding P is $P_{+1}$. That is, the 'extended' values for P are actually the values for the next stage. As the output of the reverse-count-digit operator for a given input changes with stage number, the reverse-count-digit operators are given subscripts, to explicitly show stage number. That is, as stated previously, a subscript of S on $\Leftrightarrow$says that the digit bases are given by $\Lambda(s)$, per Eq. (5.13).

Thus, if we define I as the 'integer portion' operator, we can write:

$$\nu_s = I((\Leftrightarrow_s(\omega_s)+\Delta)/N) \tag{7.10}$$

$$P_{s+\nu_s} = \Leftrightarrow_{s+\nu_s}((\Leftrightarrow_s(\omega_s)+\Delta)-\nu_s N) \tag{7.11}$$

Combining Eqs. (7.10) and (7.11) with Eq. (7.7), we get:

$$\nu_s = I((\Leftrightarrow_s(\Re_{s+1}(P_{s+1}))+\Delta)/N) \tag{7.12}$$

$$P_{s+\nu_s} = \Leftrightarrow_{s+\nu_s}((\Leftrightarrow_s(\Re_{s+1}(P_{s+1}))+\Delta)-\nu_s N) \tag{7.13}$$

Thus the address for a given position number $P_{3+1}$, $0 \leq P_{s+1} \leq N-1$, within a given stage s+1, is the $P_0$ value determined by recursively calling for calculation of Eqs. (7.12) and (7.13). Of course, for stage 0, the addresses are the $P_0$ values.

The above can be used to write a very simple software routine to generate the addresses. However, the hardware implementation requires one more step, to yield further simplicity. Consider that when overflow occurs, and only when overflow occurs, that a very small look-up table is used to generate the $P_s$'s. This is to prevent the extra passes through Eqs. (7.12) and (7.13) due to overflow, which in turn fixes the number of passes required to calculate $P_0$. The fixed number becomes S, where S is the stage number, 0 to m-1, and m is the number of stages. Thus any register buffering during the calculation of $P_0$ will not yield different address processing delays for different values of the initial $P_s$, which would be tricky to handle. The contents of the look-up tables can be calculated with the above routine (i.e., Eqs. 7.12 and 7.13). The hardware implementation, as shown schematically in FIG. 2, is then modified according to FIG. 5. Note that each look-up table is only 'offset' words in size.

Figure 5:
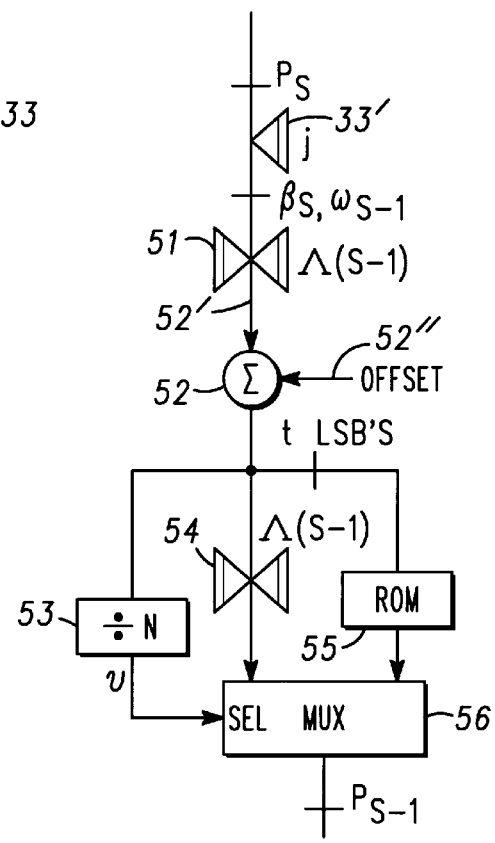
FIG. 5 is a schematic diagram of modifications to the address generator of FIG. 2 (or FIG. 7) to render it causal, in accordance with the teachings of the present invention.

FIG. 5 illustrates modification 50 to provide a causal address generator from address generator 30 of FIG. 2. Modification 50 includes circular-rotate-left-upper-j-digits-by-one-position operators 33', operator 51 and summer 52 accepting inputs via inputs 52' and 52", with 52' being coupled to the output of operator 51 and input 52" being coupled to an offset generator, which may be ROM or may be RAM if programmability is desired. Summer or adder 52 has an output that is coupled to an input of each of divide-by-N 53, operator 54 and ROM 55. Each of divide-by-N 53, operator 54 and ROM 55 includes an output coupled to MUX 56, which has an output providing $P_{s-1}$.

This implementation is general, in the sense that it can be used as an address generator for any FFT utilizing any combination of radices. It is possible that simplifications can be made to this general implementation, or that different implementations can be found to produce the same or similar results.

An implicit assumption has been made to this point. That is, we have assumed that processing speed is a very critical issue, and that we want the FFT results as soon as they are available, so that the next FFT calculations can begin. Thus the outputs of the final stage are assumed to be sent directly to the outside world, so that their storage in memory is not necessary. Thus x's are shown where the last 'offset' addresses should be, for the last stage of the causal FFT, as no memory accesses occur here. The time ordering (reverse-count-digit format), however, might be too inconvenient in some cases, so we would like a (simple) method such that the data can be read in any desired time order.

A method for generating these final read addresses for all possible desired output time orders is implied in this paper, though the method does not involve any necessary FFT processing. A method for generating read addresses for a time-ordered output (i.e. in output index order 0, 1, 2, . . . , N-1 in time) is provided in particular, as in general this is the most desired ordering. Also, leaving the reader an unsolved issue might cause him to ignore the entire approach, for it might be an issue for which he has strong concerns.

§ B. THE ORDERED-OUTPUT ADDRESS GENERATOR

Consider adding an extra stage to the FFT, whose sole purpose is to reorder the output. This stage would then be numbered as stage m, yielding a total of m+1 stages. FIG. 6 shows FFT time flow diagram 44 for an additional stage which, when appended to the flow diagram of FIG. 4, yields the FFT flow diagram for a final time-ordered output. Note that the read addresses for this stage m uniquely determines the x values in stage m-1.

Consider that the position numbers for this last stage can be in any order to suit our fancy, and that the time-order of the read indices can also be in any order to suit our fancy. (This final reading yields the final outputs.) This is because this extra stage is performing no useful calculation. That is, we don't care what values are provided as the $y_{m+1}$'s as we will never look at them. For all we care, the FFT can be a random number generator at this point. The values we care about, the $y_m$'s are already in memory, so all we need to do is read them in the desired order.

However, we will benefit if we choose $P_m$'s which are an easy-to-implement function of the counter outputs, and if we choose $\beta_m$'s which are an easy-to-implement function of the $P_m$'s, or, alternatively, if we choose $\beta_m$'s which are an easy-to-implement function of the counter outputs.

For this discussion, assume that $P_m=P_{m-1}$ in a time-order sense. That is, $P_m$ is the same function of the counter outputs as is $P_{m-1}$. Further assume that the desired final output order is normal order. That is, the read indices are the same as the counter output. This yields a total definition of the final stage.

We now have more equations, where we define the counter output $=C$:

$$\beta_m = \Leftrightarrow_{m-1}(P_m) \tag{8.1}$$

$$P_m = \Leftrightarrow_{m-1}(C) \tag{8.2}$$

This is consistent with:

$$\beta_m = C \tag{8.3}$$

Figure 7:
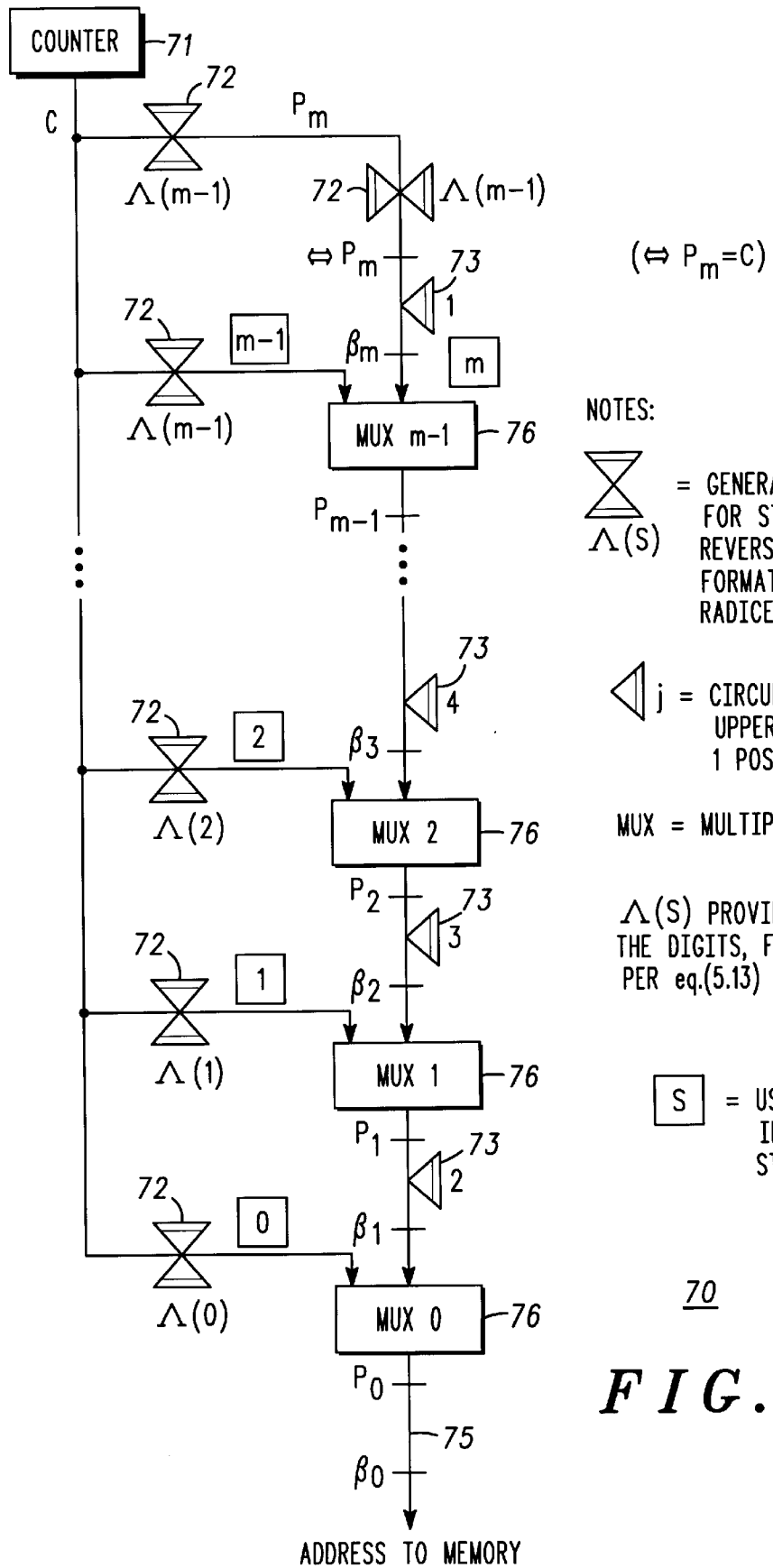
FIG. 7 is a schematic diagram of a non-causal, time-ordered output address generator, which may be made causal when the changes of FIG. 5 are included, in accordance with the teachings of the instant invention.

Thus, hardware is added to address generator 30 of FIG. 2, to yield address generator 70 of FIG. 7. Address generator 70 is the non-causal version, which can be modified per modification 50 of FIG. 5 to yield a causal version. Note that a shifting of just the upper digit is added to the portion of the implementation pertaining to stage m. This has no effect. It is shown this way only so that the instructions given in FIG. 5 apply. Note that we show two reverse-count-digit operators, using the same order of digit bases, back-to-back, which means they cancel. They are shown this way just to be consistent with rest of the implementation, where the P-as-a-function-of-C hardware and the β-as-a-function-of-P hardware is explicitly shown.

Address generator 70 comprises counter 71 coupled to reverse-count-digit operators 72, which implement the operations of Eq. (5.7). Reverse-count-digit operators 72 are each, in turn, coupled to inputs of MUXs 76. MUXs 76 are cascaded in a chain, with circular-rotate-left-upper-j-digits-by-one-position operators 73 intercalated therebetween. MUXo 76 provides the addresses to memory via output 75.

§ 9. FURTHER SIMPLIFICATIONS: Power-of-2 point FFTIs

We will now see that very significant simplifications can be made when all radices employed in the FFT are powers-of-2. We will see that timewise reverse-binary inputs can yield timewise reverse-binary outputs for any combination of power-of-2 radices.

The hardware implementation of the address generator for such FFT's will be almost trivial, requiring easily less than 1% of the transistors saved by the resultant reduced memory requirements, for the larger FFT's. For example, for an 8K-point FFT, a savings of over 1 million transistors is possible. The savings go up linearly with FFT size.

§ 9.1. The Non-causal Address Generator for a power-of-2 FFT

The first stage shown in FIG. 1 involves 4-point DFT's. Note that the input index digit which changes within the 4-point DFT is $k_2$, and that the output index digit which changes within the 4 outputs is $n_0$. The time-ordering is ordered-in, ordered-out. We have actually assumed this time-ordering for all butterflies (base DFT elements) for all stages. There is nothing wrong with this, as the butterfly (FFT engine) can be so constructed. However, extra buffering within the butterfly, yielding extra delay through the butterfly, might be required.

If all radices within the FFT are powers of 2, then a very efficient way of implementing each butterfly is centered around a radix-2 structure. That is, an 8-point DFT butterfly, for example, can be implemented as a 3-stage pipelined radix-2 DFT. However, as we have previously stated, such a structure is a natural for accepting TW reverse-binary inputs, and providing TW reverse-binary outputs. Thus our FFT time flow diagram is modified.

As an example, consider a radix-4,2,2 FFT. FIG. 8 provides FFT Time flow diagram 80 for this scenario. The time-ordering of the first stage inputs and outputs is modified as discussed. Note that this yields all of the stage 0 outputs in reverse-binary TW, and all of the stage 0 inputs in reverse-binary TW. In fact, if we continue to order the base-4 index digit in reverse binary order for all stages, then the outputs of ALL stages are in reverse binary TW. This means that the position numbers for all stages are the same. Thus we need only one hardware section to generate the position numbers. This section does nothing more than reverse the wires representing the counter outputs, to yield the reverse-binary version. Thus, no active hardware is involved.

For an FFT utilizing only power-of-2 radices, if all individual digits of the output indices are listed in reverse-binary TW, while maintaining all other properties of a reverse-count-digit format, then the outputs of each stage are reverse-binary TW.

To see this, consider that the outputs of each stage in our FFT's previously have been in reverse-count-digit sequence. However, if we binary-reverse the individual digits of a reverse-count-digit sequence, assuming all digit bases are powers of 2, we get the reverse-binary sequence. This should be apparent, as only the individual digits are not already in reverse-binary order. Note too that a reverse-binary output order for all stages does not violate the restriction on stage outputs stated in § 5. But, as stated here, all individual index digits must be sequenced in reverse-binary to allow reverse-binary ordering for the indices.

Eq. (5.14) is repeated here.

$$P_s = \Leftrightarrow_s C$$

Per the above discussion, this equation is modified as $$P_s = \Leftrightarrow_b C \tag{9.1.1}$$

where $\Leftrightarrow_b$ is the reverse binary operator.

Eq. (6.5) is repeated here.

$\Re_s(P_s) = P_s$ with the upper s+1 digits circularly rotated left Each digit is now r1 bits long, where:

$$r_s = log_2(R_s) \tag{9.1.2}$$

$R_s = $ base of digit

Thus Eq. (6.5) is modified as:

$$\Re(P_s) = P_s \tag{9.1.3}$$

with the upper $c_s$ bits circularly rotated left by $r_s$ bits, where:

$$c_s = \sum_{i=0}^{s} r_i.$$

Eqs. (6.13), (9.1.1), and (9.1.3) lead directly to * implementation of non-causal address generator 90 shown in FIG. 9. Note the similarities between FIGS. 2 and 9. All reverse-count-digit operators 32 in FIG. 2 have been replaced by a single reverse-binary operator 92 in FIG. 9. Reverse-binary operator 92 is nothing more than a wire-connection scheme, requiring no power and no additional silicon real estate. Digit shifters 33 have been replaced by bit shifters 93, which also are nothing more than wire-connection schemes. Thus the only active hardware involved in address generator 90 is counter 91 and multiplexers 96. Registers may need to be added as buffers, however. Also, as this is the non-causal version, building it would not yield a happy user.

§ 9.2. The Causal Address Generator for a power-of-2 FFT

Figures 10, 11:
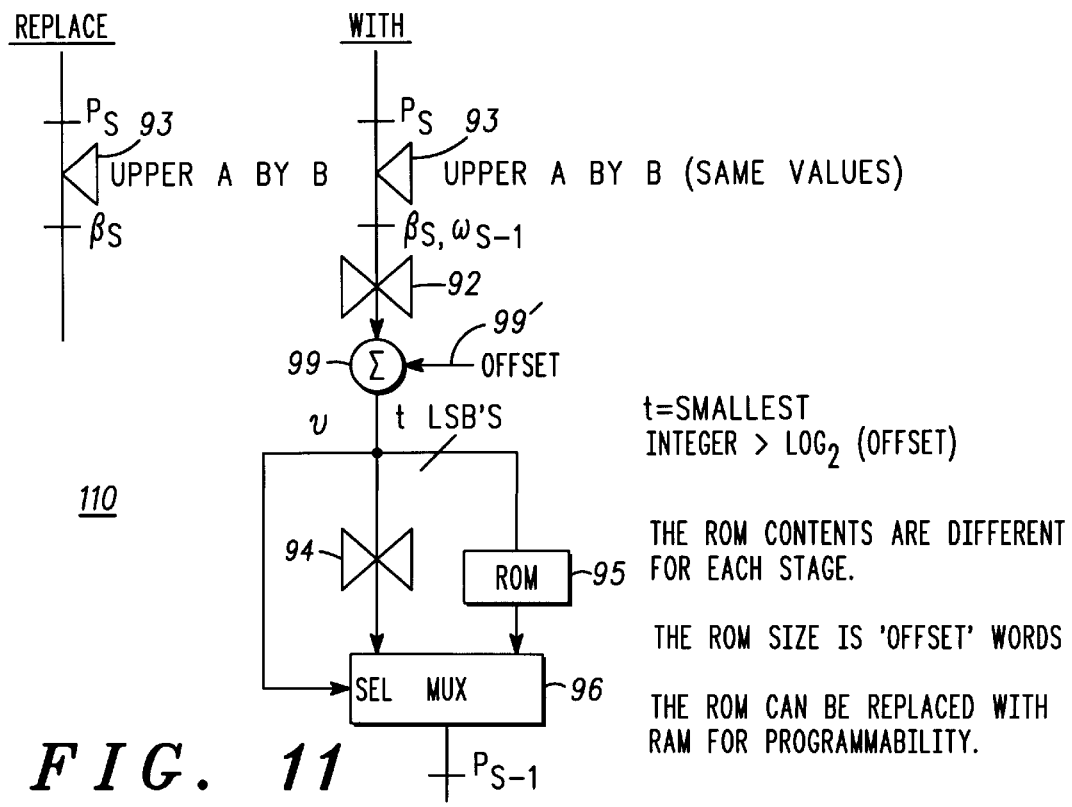
FIG. 10 is a causal time flow diagram for the power-of-2 radices FFT, in accordance with the teachings of the present invention.
FIG. 11 is a schematic diagram of modifications the address generator of FIGS. 9 or 13, to render either causal, in accordance with the teachings of the instant invention.

To determine the causal solution for the address generator for the power-of-2 radices FFT, we start by providing causal FFT time flow diagram 100 in FIG. 10. This is just as a reference for the reader, as we have already developed the logic to yield the causal solution.

Eqs. (7.12) and (7.13) are repeated here.

$$v_s = I((\leftrightarrow_s(\Re_{s+1}(P_{s+1})) + \Delta)/N)$$
$$P_{s+v_s} = \leftrightarrow_{s+v_s}((\leftrightarrow_s(\Re_{s+1}(P_{s+1})) + \Delta) - v_s N)$$

Since each reverse-count-digit operator (e.g., operators 32, FIG. 2) becomes reverse digit operator 93 (FIG. 9) for our power-of-2 radices FFT's, these equations are modified as:

$$v_s = I((\leftrightarrow_b(\Re_{s+1}(P_{s+1})) + \Delta)/N) \quad (9.2.1)$$
$$P_{s+v_s} = \leftrightarrow_b((\leftrightarrow_b(\Re_{s+1}(P_{s+1})) + \Delta) - v_s N) \quad (9.2.2)$$

We have assumed that all radices used in the FFT are powers of 2, so N must be a power of 2. If we define AND as the 'logical ANDT operator' then Eqs. (9.2.1) and (9.2.2) become:

$$v_s = ((\leftrightarrow_b(\Re_{s+1}(P_{s+1})) + \Delta) AND(N)/N) \quad (9.2.3)$$
$$P_{s+v_s} = \leftrightarrow_b((\leftrightarrow_b(\Re_{s+1}(P_{s+1})) + \Delta) AND(N-1)) \quad (9.2.4)$$

Per the same reasoning provided in § 7, the hardware implementation of address generator 90, as shown in FIG. 9, is then modified according to modification 110 of FIG. 11, to yield the causal address generator. Modification 110 comprises bit rotate operator 93 coupled to reverse-binary operator 92, which in turn has an output coupled to an input of adder 99. Adder 99 combines the output of reverse-binary operator 92 with offset 97 and provides output V, coupled to the select input of MUX 96, and an output coupled to reverse-binary operator 94 and ROM 95, both having outputs coupled to MUX 96. This ensemble of modifications 110 replaces each bit rotate operator 93 of FIG. 9 to provide a causal address generator for the power-of-two FFT.

This implementation is considered power-of-2-radix general, in the sense that it can be used as an address generator for any combination of power-of-2 radices. However, this hardware implementation is specifically tailored to a particular ordering of radices. For example, if stage 0 is a radix-8 stage, then the hardware is adjusted appropriately, and any FFT utilizing the address generation hardware must have a radix-8 stage 0. There is nothing wrong with this, for a variety of applications. However, there is also a variety of applications for which one single hardware implementation should allow any combination of power-of-2 radices in any order.

§ 9.3. The Most General Address Generator for a power-of-2 FFT

Non-causal-any-power-of-2-radix-order address generator 120 is shown in FIG. 12. Non-causal-any-power-of-2-radix-order address generator 120 comprises counter 121 coupled to reverse-binary operator 122, which has an output coupled to an input of each of MUXs 126 and also to bit rotate operator 123. Bit rotate operator 123 has an output coupled to MUX4 126. MUXs 126 are concatenated as before and are separated by bit rotate operators 123, all the way down to output 125 of MUXo 126, which supplies the addresses to memory.

Modification to make non-causal-any-power-of-2-radix-order address generator 120 causal is simple: first, use the modifications of FIG. 11 on address generator 120 of FIG. 12; and second, replace offset 97 with offset or zero. This is the most general power-of-2 implementation, and can be used for any and all power-of-2-point FFT's, with any power-of-2 radix or combination of radices. Further simplification may be possible, but such simplifications are considered to be within the scope of this invention.

Further discussion of FIG. 12 is appropriate here. For implementation to work, it must be controlled so as to be the functional equivalent of FIG. 9. For example, suppose stage 0 of the FFT is radix-4, and that stage 1 of the FFT is radix-8, and that stage 2 is radix 2, for a 64-point FFT. Looking at FIG. 12, this means the following:

- on the output of mux 1, 0 is selected as the shift value (that is, CRL the upper 2 bits by 0; i.e. do nothing)
- on the output of mux 2, 0 is selected as the shift value
- on the output of mux 3, 0 is selected as the shift value
- on the output of mux 4, 3 is selected as the shift value (that is, CRL the upper 5 bits by 3)
- on the 'output of mux 5', 1 is selected as the shift value (note that for a 64-pt FFT, no MUX 5 would be necessary, but MUX 5 may be there to make larger FFT's possible.)

The same comments above apply for making the causal version into a 4,8,2-radix FFT, with the additional instruction:

- whenever the shift value is 0, the value selected for 'offset or 0' is 0. Otherwise, the value selected is 'offset'.

The general rule to follow here:

- determine what is needed based upon an implementation as in FIGS. 9/11, then control the implementation of FIGS. 12/11 (with the offset or zero modification) to function that way.

Usually, there isn't much desire for a radix greater than 16, so usually circular rotate lefts (CRL's) of more than 4 bits are not used. Thus these shifts can be removed from the implementation. Likewise, if a radix of more than 8 is never required, then CRL's of more than 3 bits can be removed. If a radix of more than 4 is never required, then CRL's of more than 2 bits can be removed. If a radix of more than 2 is never required, then only CRL's of 1 bit are required, as CRL's of 0 bits are also eliminated in this case.

Note that all implementations previously developed for the any-radices FFT can be modified for the power-of-2 radices FFT, by replacing the reverse-count-digit operator by the reverse-binary operator, and by replacing the CRL of digits by a CRL of bits. The number of bits rotated, and the number of bits by which they're rotated, are determined by the radices of the digits, as previously discussed.

Figure 13:
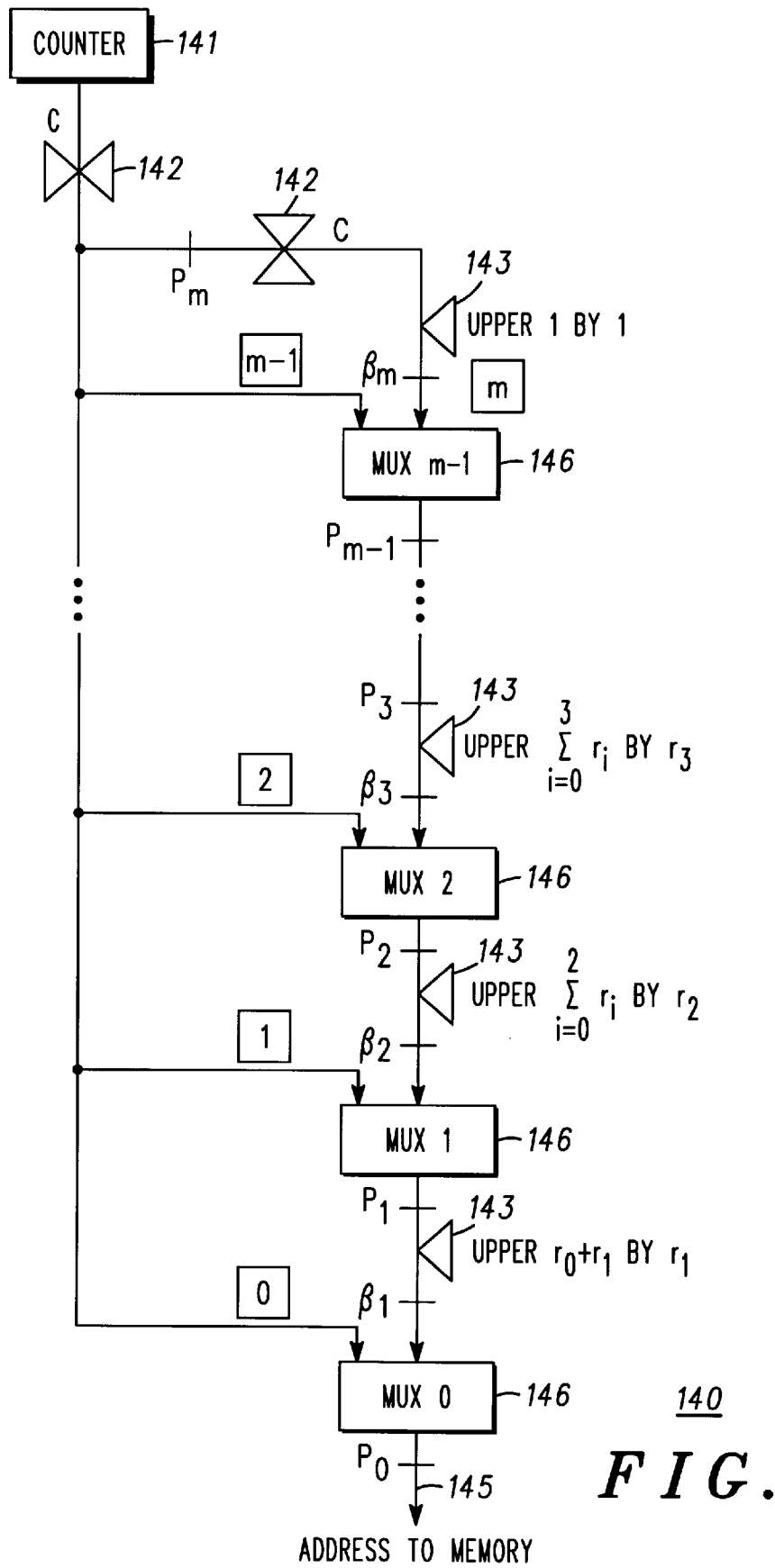
FIG. 13 is a schematic diagram of a modified ordered-output address generator for a power-of-2 radices FFT, in accordance with the teachings of the present invention.

The ordered-output address generator, discussed in § 8, is still valid for the power-of-2 radices FFT, with these substitutions. Of course, only one reverse-binary operator (e.g., 92, FIG. 9, 122, FIG. 12) is necessary on the counter output. A schematic diagram of modified ordered-output address generator 140 for a power-of-2 radices FFT is shown in FIG. 13. Modified ordered-output address generator 140 comprises counter 141 having an output coupled to reverse-binary operator 142. Reverse-binary operator 142 has an output coupled to another reverse-binary operator 142 and also coupled to inputs to MUXs 146. MUXs 146 and bit rotate operators 143 are alternately coupled in series as in FIGS. 9 and 12 to provide addresses to memory via output 145.

Each example in this paper has assumed the same processing delay for every stage throughout the FFT calculation, independent of radix. This is not considered a restriction, as equal processing delays makes the TW transition from one radix to another more smooth, and eliminates wasted FFT engine cycles. This is true independent of FFT pipelined engine implementation.

Note that none of the implementations shown include any buffer registers, although they would almost certainly be required. Care should be taken when adding these registers, so that the delay through any and all paths of the address generator is the same. That is, the delay from the counter outputs to the stage S address outputs should be the same as the delay from the counter outputs to the stage s' address outputs, $s \neq s'$.

§ 10. THE TWIDDLE INDEX GENERATOR

In § 3, we discussed the twiddle indices enough so that they could be interpreted properly on an FFT Time flow diagram. A method for generating the twiddle indices was briefly discussed. Here the use of the twiddle indices is discussed in more detail, and an implementation is provided.

The discussion in § 3 leads directly to the implementation of twiddle index generator 150 shown in FIG. 14. Twiddle index generator 150 comprises counter 151 having an output coupled to an input of reverse-binary block 152. Reverse-binary block 152 has an output coupled to a first input of logical AND 153. Logical AND 153 has a second input coupled to ROM 154, which generates an appropriate mask in response to the stage number input to ROM 154. Logical AND 153 has output 155, which provides the twiddle indices. This is for a power-of-2 radices FFT, as a single reverse-binary block 152 is shown, rather than several reverse-count-digit blocks, one for each stage (see, e.g., FIG. 11).

Twiddle index generator 150 runs in parallel with the address generator (e.g., address generator 120 modified as discussed in connection with FIGS. 11 and 12), and provides (via output 155) the twiddle values needed by each butterfly. Counter 151 is identical to counters 121 (FIG. 12), 141 (FIG. 13), 91 (FIG. 9), 31 (FIG. 2), 71 (FIG. 7). Twiddle index generator 150 is the same for the non-causal or causal FFT. Twiddle index generator 150 is much simpler than the corresponding address generator. As the implementation uses ROM 154 (or other memory) look-up scheme, an explanation of the contents of ROM 154 (or other memory) is needed. The values in the look-up table are the masks, which are ANDed (block 153) with the $P_s$'s to yield the twiddle indices on output 155.

From Eq. (3.5), we can see that the mask for stage s is as follows:

$$mask_s = (\emptyset_s, \perp_{s-1}, \perp_{s-2}, \ldots, \perp_0, \emptyset_{s+1}, \emptyset_{s+2}, \ldots, \emptyset_{m-1})$$

where $\perp_j$=digit for $R_j-1$, base $R_j$ (the max possible digit value), and:

$$\emptyset_j = 0, \text{ base } R_j \quad (10.1)$$

EXAMPLE

As an example, consider a 5-stage radix 2 FFT, which yields 32 points. The masks are as shown below in TABLE I for each stage:

TABLE I

Masks for a 5-stage, radix 2 FFT.

| stage | mask (binary, LSB on right) |
|---|---|
| 0 | 00000 |
| 1 | 01000 |
| 2 | 01100 |
| 3 | 01110 |
| 4 | 01111 |

Consider a 5-stage radix 8 FFT, which yields 32768 points. The masks are as shown below in TABLE II for each stage:

TABLE II

Masks for a 5-stage, radix 8 FFT.

| stage | mask (octal) | mask (binary) |
|---|---|---|
| 0 | 00000 | 000000000000000 |
| 1 | 07000 | 000111000000000 |
| 2 | 07700 | 000111111000000 |
| 3 | 07770 | 000111111111000 |
| 4 | 07777 | 000111111111111 |

For a 16-point, radix 4,2,2 FFT, the masks are as shown below in TABLE III for each stage:

TABLE III

Masks for a 16 point, radix 4, 2, 2 FFT.

| stage | radix | mask (binary) |
|---|---|---|
| 0 | 4 | 0000 |
| 1 | 2 | 0110 |
| 2 | 2 | 0111 |

For completeness, we now discuss how the twiddle indices are used by the FFT engine.

Eqs. (3.4) and (3.5) are repeated here.

$$T(x) = W^x \quad (10.2)$$

$$y_i(n_{i-1}, \ldots, n_1, n_0, k_{m-i-1}, \ldots, k_0) = \quad (10.3)$$

$$\sum_{k_{m-i}} [y_{i-1}(n_{i-2}, \ldots, n_1, n_0, k_{m-i}, \ldots, k_0) W^{n_{i-1} k_{m-i}(N/R_{i-1})}] \times$$

$$[T(\emptyset_{i-1}, n_{i-2}, n_{i-3}, \ldots, n_0, \emptyset_i, \emptyset_{i+1}, \ldots, \emptyset_{m-1})]^{k_{m-i}}$$

$$i = 1, 2, \ldots, m$$

As the summation of the term within the first set of brackets is the equation for a $R_{i-1}$-point DFT, we can consider that the entire equation is for a $R_{i-1}$-point DFT, with the inputs first multiplied, or 'twiddled', by the twiddle factors. That is, the first thing the FFT engine does, after receiving a complex data word from the memory, is multiply the data word by the twiddle factor. Then the only other thing the FFT engine does is calculate the $R_{i-1}$-point DFT.

Each twiddle factor is uniquely determined by the twiddle index, and by the $k_{m-i}$ value corresponding to the input index. Thus the twiddle factor can be determined inside the FFT engine, with a simple look-up table or processing hardware or combination. This is a requirement for the FFT engine anyway, so no new burden is placed on the FFT engine.

§ 11. REVIEW OF THE FFT ARCHITECTURE

Figure 15:
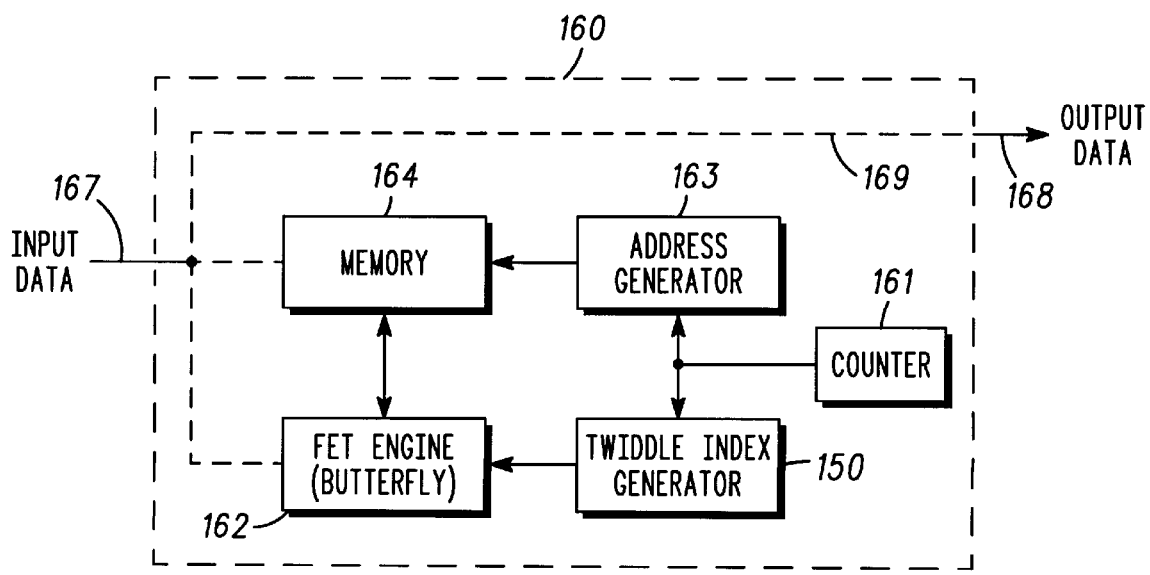
FIG. 15 is a block diagram of the general architecture of an FFT processor, in accordance with the teachings of the instant invention.

The overall general architecture of FFT processor 160, as suggested by this paper, is shown in FIG. 15. Note that only one counter 161 is shown, as both address generator 163 and twiddle factor generator 150 can share counter 161. Data inputs 167, to FFT processor 160, can go to memory 164 or directly to FFT engine 162, if the time-wise input order is acceptable to FFT engine 162 (i.e., if it is in reverse-count-digit order or otherwise properly formatted). Also, FFT engine 162 can provide FFT processor outputs 168 directly, if the outside world can accept the scrambled ordering, such as reverse-count digit ordering. Memory 164 can provide the output data if some other ordering is required. These options are shown with dotted lines 169.

Thus, an FFT addressing method and apparatus has been described which overcomes specific problems and accomplishes certain advantages relative to prior art methods and mechanisms. This method and apparatus provides the only known solutions which simultaneously allow the FFT processor to run at more than 50% efficiency AND require less than 2XN words of memory for the FFT processor's use. The solutions given here, allow 100% box efficiency with only N words of memory. This is a combination of the fastest box possible and the minimum memory possible. Further, the solutions allow for the box to be an FFT utilizing ANY combination of radices.

This discussion has focused on an FFT address generator for a maximum-speed, minimum-memory FFT using any combination of any radices. The address generator, even for the general case, is surprisingly simple. We have also seen that even further significant simplification is possible for an FFT utilizing only power-of-2 radices. We mention here that such simplification is also possible if the FFT utilizes only power-of-B radices, where B is any integer$\geq 2$.

Future processing requirements, for a variety of applications, are expected to necessitate very large, high-speed FFT's. The applications include communications, radar, sonar, speech signal-processing, imaging, biomedical engineering, television, music synthesis, convolution and correlation, simulation, general analysis, and many others.

The FFT is a very widely used apparatus. Thus a possible 40% or more savings, in real estate and power requirements for FFT processors, while allowing for higher processing speeds, will be hard for many users to resist. A patent on a scheme which allows for such savings could financially be very beneficial.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

I claim:

1. An address generator for a fast Fourier transform device, said address generator comprising:

a counter having a counter output;

a memory;

a series of M stages, where M represents the number of points to be transformed, each stage of said M stages comprising:

a coupling to said counter;

a first operator having an input coupled to said counter output, said first operator being a reverse-count digit operator;

a second operator having an input coupled to an output of a preceding stage, said second operator being a circular-rotate-left-upper-j-digits-by-one-position-operator.;

a multiplexer having a first input coupled to an output of said first operator and a second input coupled to said second operator; and an address output, said address output for providing memory addresses to said memory of said fast Fourier transform device, said address output coupled to said the last stage counter.

2. An address generator as claimed in claim 1, wherein a first of said M stages has an input of said second operator coupled to said counter output.

3. An address generator as claimed in claim 1, wherein said address generator comprises a monolithic integrated circuit.

4. A fast Fourier transformer comprising:

an FET engine having a twiddle index input and a memory bus coupled to a data input;

a memory coupled to said memory bus;

an address generator coupled to said memory;

a twiddle index generator including an output coupled to said twiddle index input;

a counter having an output coupled to inputs of said twiddle index generator and said address generator; and a data output coupled to said FET engine and to said memory;

wherein said address generator comprises:

a series of M stages, where M represents the number of points to be transformed, each stage of said M stages comprising:

a coupling to said counter;

a first operator having an input coupled to said counter output, said first operator being a reverse-count digit operator;

a second operator having an input coupled to an output of a preceding stage, said second operator being a circular-rotate-left-upper-j-digits-by-one-position-operator.;

a multiplexer having a first input coupled to an output of said first operator and a second input coupled to said second operator; and an address output, said address output for providing memory addresses to said memory of said fast Fourier transformer, said address output coupled to the last stage.

5. A fast Fourier transformer as claimed in claim 4, wherein a first of said M many stages has an input of said second operator coupled to said counter output.

\* \* \* \* \*

UNITED STATES PATENT AND TRADEMARK OFFICE
CERTIFICATE OF CORRECTION

PATENT NO.: 6,035,313
DATE: March 7, 2000
INVENTOR(S): Jeffrey D. Marchant

It is certified that error appears in the above-identified patent and that said Letters Patent are hereby corrected as shown below:

In claim 1, column 24, line 20, delete "counter"

In claim 4, column 24, line 28, delete "FET" and replace with --FFT--

In claim 4, column 24, line 36, delete "FET" and replace with --FFT--.

Signed and Sealed this

Eighth Day of May, 2001

*Attest:*

NICHOLAS P. GODICI

*Attesting Officer*  Acting Director of the United States Patent and Trademark Office